US012417744B2

(12) United States Patent
Yu et al.

(10) Patent No.: US 12,417,744 B2

(45) Date of Patent: Sep. 16, 2025

(54) GATE DRIVING CIRCUIT HAVING A GATING CIRCUIT, AND DRIVING METHOD THEREOF

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Ziyang Yu, Beijing (CN); Haijun Qiu, Beijing (CN); Ming Hu, Beijing (CN); Zhiliang Jiang, Beijing (CN); Tianyi Cheng, Beijing (CN); Jianpeng Wu, Beijing (CN); Erjin Zhao, Beijing (CN); Mengqi Wang, Beijing (CN); Wenbo Chen, Beijing (CN); Cong Liu, Beijing (CN); Qian Xu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/288,412

(22) PCT Filed: Dec. 19, 2022

(86) PCT No.: PCT/CN2022/140044

§ 371 (c)(1),
(2) Date: Oct. 26, 2023

(87) PCT Pub. No.: WO2024/130491

PCT Pub. Date: Jun. 27, 2024

(65) Prior Publication Data

US 2025/0087163 A1 Mar. 13, 2025

(51) Int. Cl.
*G09G 3/3266* (2016.01)
*G09G 3/3258* (2016.01)

(52) U.S. Cl.
CPC ......... *G09G 3/3266* (2013.01); *G09G 3/3258* (2013.01); *G09G 2300/0819* (2013.01);
(Continued)

(58) Field of Classification Search
CPC .................................................... G09G 3/3266
(Continued)

(56) References Cited

U.S. PATENT DOCUMENTS

2001/0022572 A1 9/2001 Murade
2004/0021650 A1 2/2004 Yamashita et al.
(Continued)

FOREIGN PATENT DOCUMENTS

CN 102779478 A 11/2012
CN 104392686 A 3/2015
(Continued)

OTHER PUBLICATIONS

International Search Report dated Sep. 18, 2024, issued in Application No. PCT/CN2024/101236, with English translation. (24 pages).
(Continued)

*Primary Examiner* — Long D Pham
(74) *Attorney, Agent, or Firm* — WHDA, LLP

(57) ABSTRACT

A driving circuit includes a driving signal generation circuit, a gating circuit, an output control circuit, an output circuit and a voltage control circuit; the driving signal generation circuit generates an Nth stage of driving signal, the output control circuit connects the first control node and the second node under the control of the potential of the first node; the gating circuit controls to write a gating input signal into the first node under the control of a gating control signal; the
(Continued)

voltage control circuit controls a potential of the second node according to a potential of the first node; the output circuit connects the output driving terminal and the first voltage terminal under the control of the potential of the second node, and connects the output driving terminal and the second voltage terminal under the control of the potential of the third control node.

20 Claims, 19 Drawing Sheets

(52) U.S. Cl.
CPC ............... *G09G 2300/0842* (2013.01); *G09G 2300/0861* (2013.01); *G09G 2310/0286* (2013.01); *G09G 2310/08* (2013.01); *G09G 2330/021* (2013.01)

(58) Field of Classification Search
USPC .......................................................... 345/214
See application file for complete search history.

(56) References Cited

U.S. PATENT DOCUMENTS

| | | | |
|---|---|---|---|
| 2011/0205196 | A1 | 8/2011 | Okuno et al. |
| 2014/0093028 | A1 | 4/2014 | Wu |
| 2014/0253418 | A1 | 9/2014 | Pyun et al. |
| 2015/0034950 | A1 | 2/2015 | Miyazawa et al. |
| 2016/0148556 | A1 | 5/2016 | Tseng et al. |
| 2016/0351112 | A1 | 12/2016 | Qing et al. |
| 2018/0090090 | A1 | 3/2018 | Feng et al. |
| 2019/0057638 | A1 | 2/2019 | Kim et al. |
| 2019/0058029 | A1 | 2/2019 | Woo et al. |
| 2019/0180834 | A1 | 6/2019 | Yuan et al. |
| 2019/0304375 | A1 | 10/2019 | Kim et al. |
| 2019/0392916 | A1 | 12/2019 | Gu et al. |
| 2020/0184898 | A1 * | 6/2020 | Choi .................... G09G 3/3233 |
| 2020/0251044 | A1 * | 8/2020 | Lin .................... H03K 19/0019 |
| 2020/0342811 | A1 | 10/2020 | Xuan et al. |
| 2021/0193040 | A1 | 6/2021 | Na |
| 2022/0284861 | A1 | 9/2022 | Yang et al. |
| 2022/0343841 | A1 | 10/2022 | Shang et al. |
| 2023/0057970 | A1 | 2/2023 | Yamamoto |
| 2023/0207031 | A1 | 6/2023 | Wang et al. |
| 2023/0252933 | A1 | 8/2023 | Guo et al. |
| 2023/0282170 | A1 | 9/2023 | Shang et al. |

FOREIGN PATENT DOCUMENTS

| | | | |
|---|---|---|---|
| CN | 106157923 | A | 11/2016 |
| CN | 106971692 | A | 7/2017 |
| CN | 106991973 | A | 7/2017 |
| CN | 107393473 | A | 11/2017 |
| CN | 107784977 | A | 3/2018 |
| CN | 108597437 | A | 9/2018 |
| CN | 108694894 | A | 10/2018 |
| CN | 109427293 | A | 3/2019 |
| CN | 109830256 | A | 5/2019 |
| CN | 110322834 | A | 10/2019 |
| CN | 111508433 | A | 8/2020 |
| CN | 111933083 | A | 11/2020 |
| CN | 111933084 | A | 11/2020 |
| CN | 112687230 | A | 4/2021 |
| CN | 112927644 | A | 6/2021 |
| CN | 112992246 | A | 6/2021 |
| CN | 113178161 | A | 7/2021 |
| CN | 113178221 | A | 7/2021 |
| CN | 113192551 | A | 7/2021 |
| CN | 113421528 | A | 9/2021 |
| CN | 113689824 | A | 11/2021 |
| CN | 113689825 | A | 11/2021 |
| CN | 113793570 | A | 12/2021 |
| CN | 113870786 | A | 12/2021 |
| CN | 114222615 | A | 3/2022 |
| CN | 114495784 | A | 5/2022 |
| CN | 114974067 | A | 8/2022 |
| CN | 111798788 | B | 9/2022 |
| CN | 217606538 | U | 10/2022 |
| CN | 115376441 | A | 11/2022 |
| CN | 115482780 | A | 12/2022 |
| CN | 116778868 | A | 9/2023 |
| CN | 117059033 | A | 11/2023 |
| JP | 2013213912 | A | 10/2013 |
| JP | 2022000833 | A | 1/2022 |
| KR | 20170079775 | A | 7/2017 |
| KR | 20180014365 | A | 2/2018 |
| WO | 2021161505 | A1 | 8/2021 |
| WO | 2022252092 | A1 | 12/2022 |
| WO | 2023/213175 | A1 | 11/2023 |

OTHER PUBLICATIONS

Ex Parte Quayle Action dated Feb. 13, 2025, issued in U.S. Appl. No. 18/558,383 (20 pages).

* cited by examiner

GATE DRIVING CIRCUIT HAVING A GATING CIRCUIT, AND DRIVING METHOD THEREOF

TECHNICAL FIELD

The present disclosure is the U.S. national phase of PCT Application No. PCT/CN2022/140044 filed on Dec. 19, 2022, which are incorporated herein by reference in their entireties.

BACKGROUND

In the related art, when an Organic Light Emitting Diode (OLED) display updates an image, it is necessary to initialize and write pixel voltages to all rows of pixel circuits within one frame. And in some special images, such as the Always On Display (AOD) images, the AOD image is an image that controls the partial lighting of the screen without lighting up the entire mobile phone screen, a static image or a less updated image, most of the pixel circuits in the whole screen do not need to update the pixel voltage, that is, most of the pixel circuits can maintain the original display brightness through low-leakage low temperature polycrystalline oxide (LTPO) thin film transistor (TFT), and repeated flashing on these pixel circuits causes waste of power consumption

SUMMARY

In one aspect, the present disclosure provides in some embodiments a driving circuit, including a driving signal generation circuit, an output control circuit, a gating circuit, a voltage control circuit and an output circuit; wherein the driving signal generation circuit is electrically connected to a first control node, a second control node and an Nth stage of driving signal output terminal, is configured to generate and output an Nth stage of driving signal through the Nth stage of driving signal output terminal under the control of a potential of the first control node and a potential of the second control node: the output control circuit is electrically connected to a first node, the first control node and a second node respectively, and is configured to control to connect the first control node and the second node under the control of a potential of the first node; the gating circuit is electrically connected to the first node, a gating input terminal and a gating control terminal, and is configured to control to write a gating input signal provided by the gating input terminal into the first node under the control of a gating control signal provided by the gating control terminal: the voltage control circuit is electrically connected to the first node and the second node respectively, and is configured to control a potential of the second node according to the potential of the first node; the output circuit is electrically connected to the second node, a third control node, a first voltage terminal, a second voltage terminal and an output driving terminal respectively, is configured to control to connect the output driving terminal and the first voltage terminal under the control of the potential of the second node, and control to connect the output driving terminal and the second voltage terminal under the control of a potential of the third control node; the third control node and the second control node are different nodes, N is a positive integer.

Optionally, the gating circuit is configured to control to write the gating input signal provided by the gating input terminal into the first node when a potential of the (N−1)th stage of third node is a second voltage and a potential of the Nth stage of driving signal is the second voltage.

Optionally, the gating circuit includes a first transistor; a gate electrode of the first transistor is electrically connected to the gating control terminal, and a first electrode of the first transistor is electrically connected to the first node, a second electrode of the first transistor is electrically connected to the gating input terminal.

Optionally, the gating control terminal includes a first gating control terminal and a second gating control terminal; the gating circuit includes a first transistor and a second transistor; a gate electrode of the first transistor is electrically connected to the first gating control terminal, a first electrode of the first transistor is electrically connected to the first node, and a second electrode of the first transistor is electrically connected to a first electrode of the second transistor; a gate electrode of the second transistor is electrically connected to the second gating control terminal, and a second electrode of the second transistor is electrically connected to the gating input terminal; the first gating control terminal is the Nth stage of driving signal output terminal, the second gating control terminal is an (N−1)th stage of third node, and both the first transistor and the second transistor are p-type transistors; or, the first gating control terminal is the (N−1)th stage of third node, the second gating control terminal is the Nth stage of driving signal output terminal, and the first transistor and the second transistor are p-type transistors: or, the first gating control terminal is the (N−1)th stage of driving signal output terminal, the second gating control terminal is the Nth stage of driving signal output terminal, the first transistor is an n-type transistor, and the second transistor is a p-type transistor; or, the first gating control terminal is the Nth stage of driving signal output terminal, the second gating control terminal is the (N−1)th stage of driving signal output terminal, the first transistor is a p-type transistor, and the second transistor is an n-type transistor; or, the first gating control terminal is connected to an inversion signal of the (N−1)th stage of driving signal, the second gating control terminal is the Nth stage of driving signal output terminal, the first transistor and the second transistor are both p-type transistors; or, the first gating control terminal is the Nth stage of driving signal output terminal, and the second gating control terminal is connected to the inversion signal of the (N−1)th stage of driving signal: the first transistor and the second transistor are both p-type transistors; or, the first gating control terminal is the (N−1)th stage of driving signal terminal, the second gating control terminal is connected to an inversion signal of the Nth stage of driving signal, and the first transistor and the second transistor are both n-type transistors; or, the first gating control terminal is connected to the inversion signal of the Nth stage of driving signal, the second gating control terminal is the (N−1)th stage of driving signal terminal, and the first transistor and the second transistor are both n-type transistors.

Optionally, the output control circuit includes a third transistor; a gate electrode of the third transistor is electrically connected to the first node, a first electrode of the third transistor is electrically connected to the first control node, and a second electrode of the third transistor is electrically connected to the second node.

Optionally, the voltage control circuit includes a first capacitor: a first terminal of the first capacitor is electrically connected to the first node, and a second terminal of the first capacitor is electrically connected to the second node.

Optionally, the driving circuit further includes a second node control circuit; wherein the second node control circuit is electrically connected to a third control node, a second node and a first voltage terminal, and is configured to control to connect the second node and the first voltage terminal under the control of a potential of the third control node.

Optionally, the second node control circuit comprises a fourth transistor: a gate electrode of the fourth transistor is electrically connected to the third control node, a first electrode of the fourth transistor is electrically connected to the second node, and a second electrode of the fourth transistor is connected to the first voltage terminal.

Optionally, the output circuit includes a fifth transistor, a sixth transistor and a second capacitor; a gate electrode of the fifth transistor is electrically connected to the second node, a first electrode of the fifth transistor is electrically connected to the first voltage terminal, and a second electrode of the fifth transistor is electrically connected to the output driving terminal; a gate electrode of the sixth transistor is electrically connected to the third control node, a first electrode of the sixth transistor is electrically connected to the output driving terminal, and a second electrode of the sixth transistor is connected to the second voltage terminal; a first terminal of the second capacitor is electrically connected to the second node, and a second terminal of the second capacitor is electrically connected to the first voltage terminal.

Optionally, the driving circuit further includes an initialization circuit; wherein the initialization circuit is electrically connected to an initial control terminal, a second voltage terminal and the first node, and is configured to control to connect the first node and the second voltage terminal under the control of an initial control signal provided by the initial control terminal.

Optionally, the driving circuit further includes a first node control circuit; wherein the first node control circuit is electrically connected to a fourth node, a second voltage terminal and the first node, and is configured to control to connect the first node and the second voltage terminal under the control of a potential of the fourth node.

Optionally, the initialization circuit comprises a seventh transistor; a gate electrode of the seventh transistor is electrically connected to the initial control terminal, a first electrode of the seventh transistor is electrically connected to the first node, and a second electrode of the seventh transistor is electrically connected to the second voltage terminal.

Optionally, the first node control circuit comprises an eighth transistor; a gate electrode of the eighth transistor is electrically connected to a fourth node, a first electrode of the eighth transistor is electrically connected to the first node, and a second electrode of the eighth transistor is electrically connected to the second voltage terminal.

Optionally, the driving circuit further includes a third control node control circuit; wherein the third control node control circuit is respectively electrically connected to the first node, a fifth node, the second control node, a third control node and a sixth node, and is configured to control to connect the fifth node and the third control node under the control of the potential of the first node, and control to connect the second control node and the sixth node and control to connect the sixth node and the third control node under the control of a potential of the sixth node.

Optionally, the third control node control circuit comprises a ninth transistor, a tenth transistor and an eleventh transistor; a gate electrode of the ninth transistor is electrically connected to the first node, a first electrode of the ninth transistor is electrically connected to the fifth node, and a second electrode of the ninth transistor is electrically connected to the third control node; a gate electrode of the tenth transistor and a second electrode of the tenth transistor are both electrically connected to the sixth node, and a first electrode of the tenth transistor is electrically connected to the second control node: both a gate electrode of the eleventh transistor and a first electrode of the eleventh transistor are electrically connected to the sixth node, and a second electrode of the eleventh transistor is electrically connected to the third control node.

Optionally, the driving signal generation circuit includes a first driving output circuit, a second driving output circuit, a first control node control circuit, and a second control node control circuit; the first control node control circuit is configured to control the potential of the first control node; the second control node control circuit is configured to control the potential of the second control node; the first driving output circuit is electrically connected to the first control node, the first voltage terminal and the Nth stage of driving signal output terminal, and is configured to control to connect the Nth stage of driving signal output terminal and the first voltage terminal under the control of the potential of the first control node; the second driving output circuit is electrically connected to the second control node, the second voltage terminal and the Nth stage of driving signal output terminal, and is configured to control to connect the Nth stage of driving signal output terminal and the second voltage terminal under the control of the potential of the second control node.

Optionally, the first control node control circuit includes a seventh node control circuit, an eighth node control circuit, a third node control circuit, and a first control circuit; the seventh node control circuit is electrically connected to a seventh node, the second voltage terminal, a first clock signal terminal and a fifth node, and is configured to control to connect the seventh node and the second voltage terminal under the control of a first clock signal provided by the first clock signal terminal, and control to connect the seventh node and the first clock signal terminal under the control of a potential of the fifth node: the eighth node control circuit is electrically connected to the second voltage terminal, the seventh node, and an eighth node, and is configured to control to connect the seventh node and the eighth node under the control of a second voltage signal provided by the second voltage terminal; the third node control circuit is electrically connected to the eighth node, the second clock signal terminal and the third node, and is configured to control to connect the third node and the second clock signal terminal under the control of a potential of the eighth node, and control the potential of the third node according to the potential of the eighth node; the first control circuit is electrically connected to a second clock signal terminal, the third node, the first control node, the fifth node and the first voltage terminal, and is configured to control to connect the third node and the first control node under the control of a second clock signal provided by the second clock signal terminal, and control to connect the first control node and the first voltage terminal under the control of a potential of the fifth node.

Optionally, the second control node control circuit includes a sixth node control circuit, a fifth node control circuit, a ninth node control circuit, a fourth node control circuit, and a second control circuit; the sixth node control circuit is electrically connected to the second voltage terminal, a ninth node, a sixth node, and a fourth node, and is configured to control to connect the ninth node and the sixth node under the control of the second voltage signal provided by the second voltage terminal, and control a potential of the sixth node according to a potential of the fourth node; the fifth node control circuit is respectively electrically connected to the (N−1)th stage of driving signal output terminal, the first clock signal terminal, a fifth node, the initial control terminal and the first voltage terminal, is configured to control to connect the fifth node and the (N−1)th stage of driving signal output terminal under the control of the first clock signal provided by the first clock signal terminal, and control to connect the fifth node and the first voltage terminal under the control of the initial control signal provided by the initial control terminal; the ninth node control circuit is electrically connected to the first clock signal terminal, the (N−1)th stage of driving signal output terminal and a ninth node respectively, and is configured to control to connect the ninth node and the (N−1)th stage of driving signal output terminal under the control of the first clock signal provided by the first clock signal terminal; the fourth node control circuit is electrically connected to the seventh node, the first voltage terminal, the fourth node, the second clock signal terminal and the sixth node, and is configured to control to connect the fourth node and the first voltage terminal under the control of a potential of the seventh node, and control to connect the fourth node and the second clock signal terminal under the control of a potential of the sixth node; the second control circuit is electrically connected to the second voltage terminal, the fifth node and the second control node, and is configured to control to connect the fifth node and the second control node under the control of the second voltage signal provided by the second voltage terminal.

Optionally, the seventh node control circuit includes a twelfth transistor and a thirteenth transistor, the eighth node control circuit includes a fourteenth transistor, and the third node control circuit includes a fifteenth transistor and a third transistor, the first control circuit includes a sixteenth transistor and a seventeenth transistor; a gate electrode of the twelfth transistor is electrically connected to the first clock signal terminal, a first electrode of the twelfth transistor is electrically connected to the second voltage terminal, and a second electrode of the twelfth transistor is electrically connected to the seventh node; a gate electrode of the thirteenth transistor is electrically connected to the fifth node, a first electrode of the thirteenth transistor is electrically connected to the seventh node, and a second electrode of the thirteenth transistor is electrically connected to the first clock signal terminal; a gate electrode of the fourteenth transistor is electrically connected to the second voltage terminal, a first electrode of the fourteenth transistor is electrically connected to the seventh node, and a second electrode of the fourteenth transistor is electrically connected to the eighth node; a gate electrode of the fifteenth transistor is electrically connected to the eighth node, a first electrode of the fifteenth transistor is electrically connected to the second clock signal terminal, and a second electrode of the fifteenth transistor is electrically connected to the third node; a gate electrode of the sixteenth transistor is electrically connected to the second clock signal terminal, a first electrode of the sixteenth transistor is electrically connected to the third node, and a second electrode of the sixteenth transistor is electrically connected to the first control node; a gate electrode of the seventeenth transistor is electrically connected to the fifth node, a first electrode of the seventeenth transistor is electrically connected to the first control node, and a second electrode of the seventeenth transistor is electrically connected to the first voltage terminal.

Optionally, the sixth node control circuit includes an eighteenth transistor and a fourth capacitor, the fifth node control circuit includes a nineteenth transistor and a twentieth transistor, and the ninth node control circuit includes a twenty-first transistor, the fourth node control circuit includes a twenty-second transistor and a twenty-third transistor, and the second control circuit includes a twenty-fourth transistor; a gate electrode of the eighteenth transistor is electrically connected to the second voltage terminal, a first electrode of the eighteenth transistor is electrically connected to the ninth node, and a second electrode of the eighteenth transistor is electrically connected to the sixth node; a first terminal of the fourth capacitor is electrically connected to the fourth node, and a second terminal of the fourth capacitor is electrically connected to the sixth node; a gate electrode of the nineteenth transistor is electrically connected to the first clock signal terminal, a first electrode of the nineteenth transistor is electrically connected to the (N−1)th stage of driving signal output terminal, and a second electrode of the nineteenth transistor is electrically connected to the fifth node; a gate electrode of the twentieth transistor is electrically connected to the initial control terminal, a first electrode of the twentieth transistor is electrically connected to the first voltage terminal, and a second electrode of the twentieth transistor is electrically connected to the fifth node; a gate electrode of the twenty-first transistor is electrically connected to the first clock signal terminal, a first electrode of the twenty-first transistor is electrically connected to the (N−1)th stage of driving signal output terminal, and a second electrode of the twenty-first transistor is electrically connected to the ninth node; a gate electrode of the twenty-second transistor is electrically connected to the seventh node, a first electrode of the twenty-second transistor is electrically connected to the first voltage terminal, and a second electrode of the twenty-second transistor is electrically connected to the fourth node; a gate electrode of the twenty-third transistor is electrically connected to the sixth node, a first electrode of the twenty-third transistor is electrically connected to the fourth node, and a second electrode of the twenty-third transistor is electrically connected to the second clock signal terminal; a gate electrode of the twenty-fourth transistor is electrically connected to the second voltage terminal, a first electrode of the twenty-fourth transistor is electrically connected to the ninth node, a second electrode of the twenty-fourth transistor is electrically connected to the second control node.

Optionally, the first driving output circuit includes a twenty-fifth transistor and a fifth capacitor, and the second driving output circuit includes a twenty-sixth transistor and a sixth capacitor; a gate electrode of the twenty-fifth transistor is electrically connected to the first control node, a first electrode of the twenty-fifth transistor is electrically connected to the first voltage terminal, and a second electrode of the twenty-fifth transistor is electrically connected to the Nth stage of driving signal output terminal: a first terminal of the fifth capacitor is electrically connected to the first control node, and a second terminal of the fifth capacitor is electrically connected to the first voltage terminal; a gate electrode of the twenty-sixth transistor is electrically connected to the second control node, a first electrode of the twenty-sixth transistor is electrically connected to the Nth stage of driving signal output terminal, and a second electrode of the twenty-sixth transistor is electrically connected to the second voltage terminal; a first terminal of the sixth capacitor is electrically connected to the Nth stage of driving signal output terminal, and a second terminal of the sixth capacitor is electrically connected to the second voltage terminal.

In a second aspect, an embodiment of the present disclosure provides a driving method applied to the driving circuit, includes: generating and outputting, by the driving signal generation circuit, the Nth stage of driving signal through the Nth stage of driving signal output terminal under the control of the potential of the first control node and the potential of the second control node; controlling, by the output control circuit, to connect the first control node and the second node under the control of the potential of the first node; controlling, by the gating circuit, to write the gating input signal provided by the gating input terminal into the first node under the control of the gating control signal; controlling, by the voltage control circuit, the potential of the second node according to the potential of the first node: controlling, by the output circuit, to connect the output driving terminal and the first voltage terminal under the control of the potential of the second node, and controlling, by the output circuit, to connect the output driving terminal and the second voltage terminal under the control of the potential of the third control node; wherein the third control node and the second control node are different nodes; N is a positive integer.

In a third aspect, an embodiment of the present disclosure provides a driving module, including a plurality of stages of driving circuits; an Nth stage of driving circuit is electrically connected to a driving signal output terminal included in an (N−1)th stage of driving circuit: N is a positive integer.

In a fourth aspect, an embodiment of the present disclosure provides a display device including the driving module.

DETAILED DESCRIPTION

Figure 1:
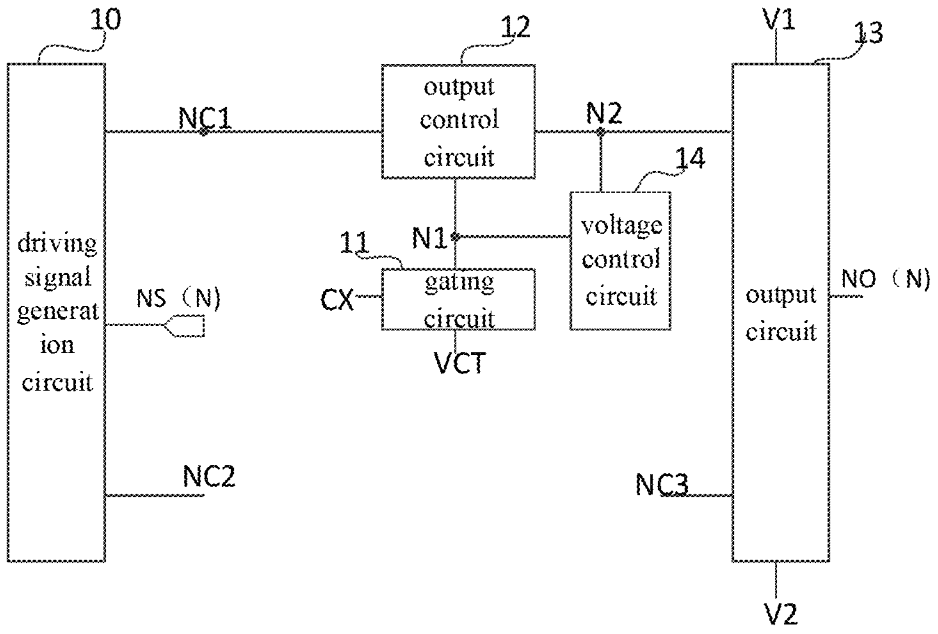
FIG. 1 is a structural diagram of a driving circuit according to an embodiment of the present disclosure.

The following will clearly and completely describe the technical solutions in the embodiments of the present disclosure with reference to the accompanying drawings. Obviously, the described embodiments are only some of the embodiments of the present disclosure, not all of them. Based on the embodiments in the present disclosure, all other embodiments obtained by those ordinary skill in the art without making creative work belong to the protection scope of the present disclosure.

The transistors used in all the embodiments of the present disclosure may be thin film transistors or field effect transistors or other devices with the same characteristics. In the embodiments of the present disclosure, in order to distinguish the two electrodes of the transistor except the gate electrode, one electrode is called the first electrode, and the other electrode is called the second electrode.

In actual operation, when the transistor is a thin film transistor or a field effect transistor, the first electrode may be a drain electrode, and the second electrode may be a source electrode: or, the first electrode may be a source electrode, and the second electrode may be a drain electrode.

The driving circuit in the embodiment of the present disclosure includes a driving signal generation circuit 10, a gating circuit 11, an output control circuit 12, an output circuit 13 and a voltage control circuit 14;

The driving signal generation circuit 10 is electrically connected to a first control node NC1, a second control node NC2 and an Nth stage of driving signal output terminal NS(N), is configured to generate and output an Nth stage of driving signal through the Nth stage of driving signal output terminal NS(N) under the control of a potential of the first control node NC1 and a potential of the second control node NC2;

The gating circuit 11 is electrically connected to the first node N1, a gating input terminal VCT and a gating control terminal CX, and is configured to control to write a gating input signal provided by the gating input terminal VCT into the first node N1 under the control of a gating control signal provided by the gating control terminal CX;

The output control circuit 12 is electrically connected to the first node N1, a first control node NC1 and a second node N2 respectively, and is configured to control to connect the first control node NC1 and the second node N2 under the control of the potential of the first node N1;

The voltage control circuit 14 is electrically connected to the first node N1 and the second node N2 respectively, and is configured to control a potential of the second node N2 according to a potential of the first node N1;

The output circuit 13 is electrically connected to the second node N2, a third control node NC3, a first voltage terminal V1, a second voltage terminal V2 and an output driving terminal NO (N) respectively, is configured to control to connect the output driving terminal NO (N) and the first voltage terminal V1 under the control of the potential of the second node N2, and control to connect the output driving terminal NO (N) and the second voltage terminal V2 under the control of the potential of the third control node NC3;

The second control node NC2 and the third control node NC3 are different nodes, N is a positive integer.

When the driving circuit shown in FIG. 1 of an embodiment of the present disclosure is in operation, the driving signal generation circuit 10 generates and outputs the Nth stage of driving signal through the Nth stage of driving signal output terminal NS(N), and the gating circuit 11 writes the gating input signal into the first node N1 under the control of thein the gating control signal; the output control circuit 12 controls to connect the first control node NC1 and the second node N2 under the control of the potential of the first node N1; the voltage control circuit 14 controls the potential of the second node N2 according to the potential of the first node N1; the output circuit 13 controls to connect the output driving terminal NO (N) and the first voltage terminal V1 under the control of the potential of the second node N2, and controls to connect the output driving terminal NO (N) and the second voltage terminal V2 under the control of the potential of the third control node NC3.

Optionally, the first voltage terminal may be a high voltage terminal, but not limited thereto.

The driving circuit shown in FIG. 1 may be an Nth stage of driving circuit.

When the driving circuit shown in FIG. 1 is working, within one frame,

Before a supply phase of the Nth stage of driving signal, the gating circuit 11 writes the gating input signal provided by the gating input terminal VCT into the first node N1 under the control of the gating control signal;

When the gating input signal is a high voltage signal, in the Nth stage of driving signal supply stage, the Nth stage of driving signal output terminal NS(N) outputs a high voltage signal, the potential of the first node N1 is a high voltage, and the output control circuit 12 controls to disconnect the first control node NC1 and the second node N2 under the control of the potential of the first node N1, and the voltage control circuit 14 controls the potential of the second node N2 to be a high voltage according to the potential of the first node N1, and the output circuit controls the output driving terminal NO (N) to maintain to output a low voltage signal, which can control the corresponding row of pixel circuits not to update the pixel voltage;

When the gating input signal is a low voltage signal, in the supply phase of the Nth stage of driving signal, the Nth stage of driving signal output terminal NS(N) outputs a high voltage signal, and the potential of the first node N1 is a low voltage, and the output control circuit 12 controls to connect the first control node NC1 and the second node N2 under the control of the potential of the first node N1, so that the potential of the second node N2 is a low voltage, and the output circuit 13 controls to connect the output driving terminal NO (N) and the first voltage terminal V1 under the control of the potential of the second node N2, so that NO (N) outputs a high voltage signal, and can control the corresponding row of pixel circuits to update the pixel voltages.

In the embodiment of the present disclosure, by controlling the gating input signal provided by the gating input terminal VCT, the update of the partial screen of the display screen can be realized, thereby reducing power consumption, or by partially updating the display screen, the ultra-low power consumption of wearable products, mobile terminals, notebook and other OLED display products may be realized.

Figure 2:
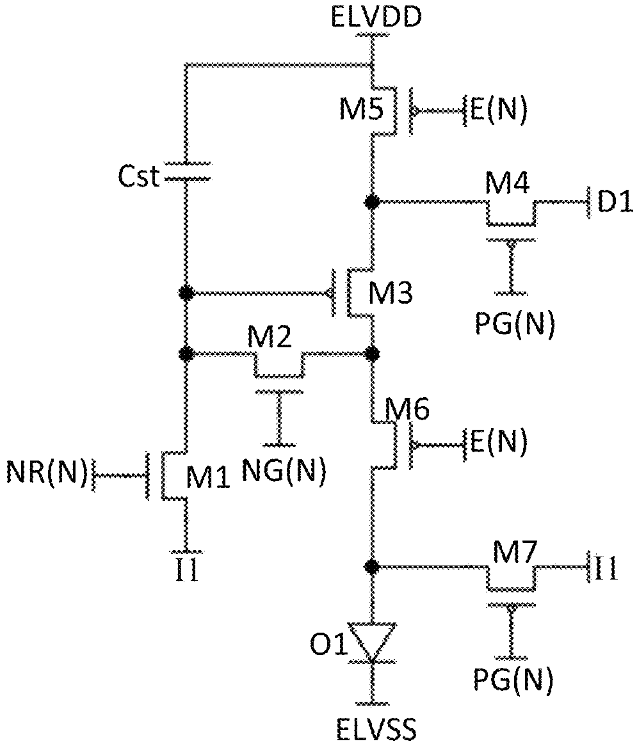
FIG. 2 is a circuit diagram of a related pixel circuit.

As shown in FIG. 2, the relevant pixel circuit may include a first display control transistor M1, a second display control transistor M2, a driving transistor M3, a fourth display control transistor M4, a fifth display control transistor M5, a sixth display control transistor M6, a seventh display control transistor M7, a storage capacitor Cst and an organic light emitting diode O1;

The gate electrode of M1 is electrically connected to the first reset terminal NR(N), the source electrode of M1 is electrically connected to the initial voltage terminal I1, and the drain electrode of M1 is electrically connected to the gate electrode of M3;

The gate electrode of M2 is electrically connected to the first scanning terminal NG(N), the source electrode of M2 is electrically connected to the gate electrode of M3, and the drain electrode of M2 is electrically connected to the drain electrode of M3;

The gate electrode of M4 is electrically connected to the second scanning terminal PG(N), the source electrode of M4 is electrically connected to the data line D1, and the drain electrode of M4 is electrically connected to the source electrode of M3;

The gate electrode of M5 is electrically connected to the light emitting control terminal E(N), the source electrode of M5 is electrically connected to the power supply voltage terminal ELVDD, and the drain electrode of M5 is electrically connected to the source electrode of M3;

The gate electrode of M6 is electrically connected to the light emitting control terminal E(N), the source electrode of M6 is electrically connected to the drain electrode of M3, the drain electrode of M6 is electrically connected to the anode of O1; the cathode of O1 is electrically connected to the terminal ELVSS;

The gate electrode of M7 is electrically connected to the second scanning terminal PG(N), the source electrode of M7 is electrically connected to the initial voltage terminal I1, and the drain electrode of M7 is electrically connected to the anode of O1.

During specific implementation, the first reset terminal NR(N) may be of the (N−1)th stage of the first scanning terminal NG(N), but not limited thereto.

In the related pixel circuit shown in FIG. 2, M1 and M2 are n-type transistors, M3, M4, M5, M6 and M7 are all p-type transistors, M1 and M2 are IGZO TFTs with small leakage current, M3 and M4, M5, M6 and M7 are all LTPS TFTs.

In the related pixel circuit shown in FIG. 2, M1 and M2 are IGZO TFTs. When low-frequency display is used, the IGZO TFT can ensure that Cst can maintain the gate voltage of M3 for a long time.

In the related pixel circuit shown in FIG. 2, the second scanning terminal PG(N) is responsible for resetting the voltage of the anode of O1 and writing the data voltage on the data line into the source electrode of the driving transistor, and the first scanning terminal NG(N) is responsible for realizing the reset of Cst, extracting Vth (Vth is the threshold voltage of the driving transistor) and writing the data voltage into the gate electrode of the driving transistor.

During specific implementation, the first scanning signal provided by the first scanning terminal NG(N) and the second scanning signal provided by the second scanning terminal PG(N) may be opposite in phase, but not limited thereto.

The driving circuit described in at least one embodiment of the present disclosure can provide the first scanning terminal NG(N) with the first scanning signal through the output driving terminal NO (N), but is not limited thereto.

Figure 3:
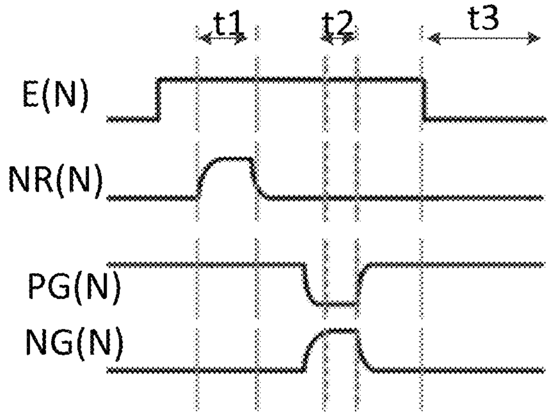
FIG. 3 is a working timing diagram of the related pixel circuit shown in FIG. 2.

As shown in FIG. 3, when the relevant pixel circuit shown in FIG. 2 is in operation, the display period may include a first display control phase t1, a second display control phase t2 and a third display control phase 13 which are set successively;

In the first display control phase t1, E(N) outputs a high voltage signal, NR(N) provides a high voltage signal, PG(N) provides a high voltage signal, NG(N) provides a low voltage signal, M5 and M6 are turned off, M1 is turned on, and the potential of the gate electrode of M3 is pulled down to an initial voltage Vinit; the initial voltage terminal I1 is configured to provide the initial voltage Vinit;

In the second display control phase 12, E(N) outputs a high voltage signal, NR(N) provides a low voltage signal. PG(N) provides a low voltage signal, NG(N) provides a high voltage signal, M5 and M6 are turned off, M1 is turned off, M2 is turned on, M4 is turned on, M2 and M3 form a diode structure, and the data voltage Vdata provided by the data line D1 charges Cst until M3 is turned off. At this time, the gate voltage of M3 is Vdata+Vth, and Vth is the threshold voltage of M3; M7 is turned on to reset the anode voltage of O1;

In the third display control phase t3, E(N) outputs a low voltage signal, NR(N) provides a low voltage signal, PG(N) provides a high voltage signal, NG(N) provides a low voltage signal, M5 and M6 are turned on, M3 drivings O1 to emit light: O1 emits light according to the voltage setting of Vdata.

It can be seen from the working process of the related pixel circuit above that NG(N) can control whether the data voltage Vdata (the data voltage Vdata can be the pixel voltage) is written into the gate electrode of M3 in the second display control phase.

Figure 4:
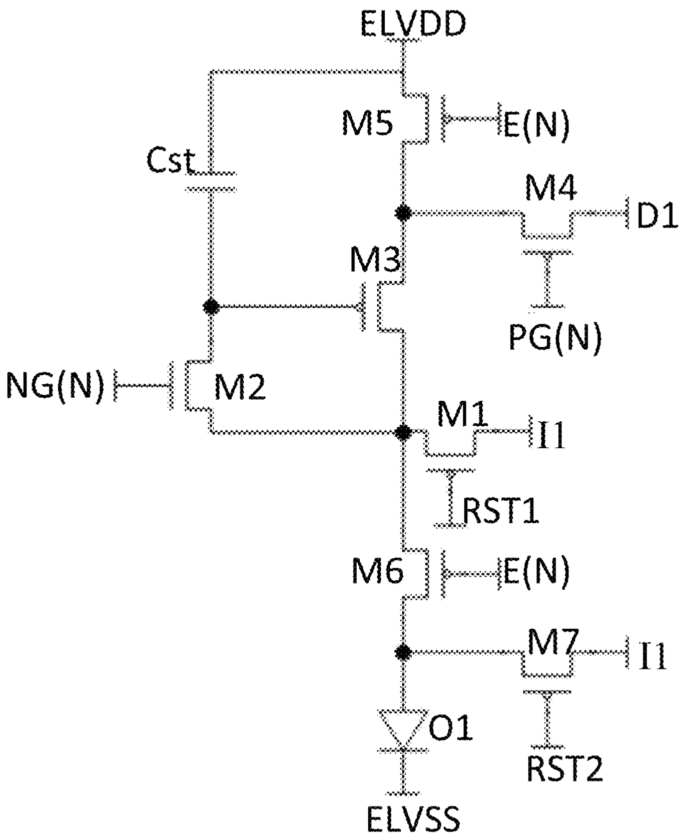
FIG. 4 is a circuit diagram of a related pixel circuit.

FIG. 4 is a circuit diagram of a related pixel circuit.

As shown in FIG. 4, the relevant pixel circuit may include a first display control transistor M1, a second display control transistor M2, a driving transistor M3, a fourth display control transistor M4, a fifth display control transistor M5, a sixth display control transistor M6, a seventh display control transistor M7, a storage capacitor Cst and an organic light emitting diode O1;

The gate electrode of M1 is electrically connected to the third reset terminal RST1, the source electrode of M1 is electrically connected to the initial voltage terminal I1, and the drain electrode of M1 is electrically connected to the drain electrode of M3;

The gate electrode of M2 is electrically connected to the first scanning terminal NG(N), the source electrode of M2 is electrically connected to the gate electrode of M3, and the drain electrode of M2 is electrically connected to the drain electrode of M3;

The gate electrode of M4 is electrically connected to the second scanning terminal PG(N), the source electrode of M4 is electrically connected to the data line D1, and the drain electrode of M4 is electrically connected to the source electrode of M3;

The gate electrode of M5 is electrically connected to the light emitting control terminal E(N), the source electrode of M5 is electrically connected to the power supply voltage terminal ELVDD, and the drain electrode of M5 is electrically connected to the source electrode of M3;

The gate electrode of M6 is electrically connected to the light emitting control terminal E(N), the source electrode of M6 is electrically connected to the drain electrode of M3, the drain electrode of M6 is electrically connected to the anode of O1; the cathode of O1 is electrically connected to the low level terminal ELVSS;

The gate electrode of M7 is electrically connected to the fourth reset terminal RST2, the source electrode of M7 is electrically connected to the initial voltage terminal I1, and the drain electrode of M7 is electrically connected to the anode of O1.

When the related pixel circuit shown in FIG. 4 is in operation, NG(N) can control whether the data voltage Vdata on the data line D1 is written into the gate electrode of the driving transistor M3.

In specific implementation, the first scanning signal provided by NG(N) can be configured to control to turn on or off the second transistor to control whether the data voltage on the data line is written into the gate electrode of the driving transistor, thereby controlling whether to update the brightness of the current row of pixel circuits, when NG(N) outputs a high voltage signal, the second transistor is turned on to update the brightness of the current row of pixel circuits; when NG(N) outputs a low voltage signal, the second transistor is always turned off, the change of the data voltage on the data line will not be written into the gate electrode of the driving transistor, and the brightness of the organic light emitting diode will not change, that is, the display brightness of the current row of pixel circuits remains unchanged in the current frame. To sum up, the pixel brightness can be refreshed by controlling the N-type transistor to be turned on or off. Therefore, when some pixels are not to be refreshed, it is sufficient to ensure that the N-type transistor is turned off.

In at least one embodiment of the present disclosure, the gating circuit is configured to control to write the gating input signal provided by the gating input terminal into the first node when the potential of the (N−1)th stage of third node is the second voltage and the potential of the Nth stage of driving signal is the second voltage.

Optionally, the second voltage may be a low voltage, but not limited thereto.

Optionally, the gating circuit includes a first transistor; a gate electrode of the first transistor is electrically connected to the gating control terminal, and a first electrode of the first transistor is electrically connected to the first node, a second electrode of the first transistor is electrically connected to the gating input terminal.

Figure 5:
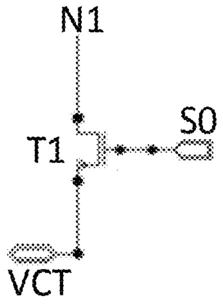
FIG. 5 is a circuit diagram of a gating circuit in a driving circuit according to an embodiment of the present disclosure.

As shown in FIG. 5, the gating circuit may include a first transistor T1;

The gate electrode of the first transistor T1 is electrically connected to the gating control terminal SO, the drain electrode of the first transistor T1 is electrically connected to the first node N1, and the source electrode of the first transistor T1 is electrically connected to the gating input terminal VCT;

T1 is a p-type transistor.

Figure 6:
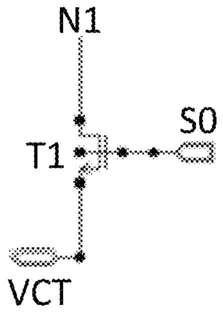
FIG. 6 is a circuit diagram of a gating circuit in a driving circuit according to an embodiment of the present disclosure.

As shown in FIG. 6, the gating circuit may include a first transistor T1;

The gate electrode of the first transistor T1 is electrically connected to the gating control terminal SO, the source electrode of the first transistor T1 is electrically connected to the first node N1, and the drain electrode of the first transistor T1 is electrically connected to the gating input terminal VCT;

T1 is an n-type transistor.

Optionally, the gating control terminal includes a first gating control terminal and a second gating control terminal: the gating circuit includes a first transistor and a second transistor;

A gate electrode of the first transistor is electrically connected to the first gating control terminal, a first electrode of the first transistor is electrically connected to the first node, and a second electrode of the first transistor is electrically connected to a first electrode of the second transistor;

A gate electrode of the second transistor is electrically connected to the second gating control terminal, and a second electrode of the second transistor is electrically connected to the gating input terminal;

The first gating control terminal is the Nth stage of driving signal output terminal, the second gating control terminal is the (N−1)th stage of third node, and both the first transistor and the second transistor are p-type transistor; or, The first gating control terminal is the (N−1)th stage of third node, the second gating control terminal is the Nth stage of driving signal output terminal, and the first transistor and the second transistor are p-type transistor; of, The first gating control terminal is the (N−1)th stage of driving signal output terminal, the second gating control terminal is the Nth stage of driving signal output terminal, the first transistor is an n-type transistor, and the second transistor is a p-type transistor; or, The first gating control terminal is the Nth stage of driving signal output terminal, the second gating control terminal is the (N−1)th stage of driving signal output terminal, the first transistor is a p-type transistor, and the second transistor is an n-type transistor; or, The first gating control terminal is connected to an inversion signal of the (N−1)th stage of driving signal, the second gating control terminal is the Nth stage of driving signal output terminal, the first transistor and the second transistor are both p-type transistors; or, The first gating control terminal is the Nth stage of driving signal output terminal, and the second gating control terminal is connected to the inversion signal of the (N−1)th stage of driving signal; the first transistor and the second transistor are both p-type transistors; or, The first gating control terminal is the (N−1)th stage of driving signal terminal, the second gating control terminal is connected to the inversion signal of the Nth stage of driving signal, and the first transistor and the second transistor are both n-type transistors; or, The first gating control terminal is connected to the inversion signal of the Nth stage of driving signal, the second gating control terminal is the (N−1)th stage of driving signal terminal, and the first transistor and the second transistor are both n-type transistors.

Figure 7:
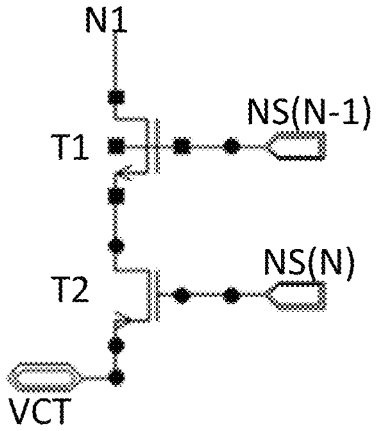
FIG. 7 is a circuit diagram of a gating circuit in a driving circuit according to an embodiment of the present disclosure.

As shown in FIG. 7, the gating circuit may include a first transistor T1 and a second transistor T2;

The gate electrode of the first transistor T1 is electrically connected to the (N−1)th stage of driving signal output terminal NS(N−1), the source electrode of the first transistor T1 is electrically connected to the first node N1, and the drain electrode of the first transistor T1 is electrically connected to the drain electrode of the second transistor T2;

The gate electrode of the second transistor T2 is electrically connected to the Nth stage of driving signal output terminal NS(N), and the source electrode of the second transistor T2 is electrically connected to the gating input terminal VCT;

T1 is an n-type transistor, and T2 is a p-type transistor.

Figure 8:
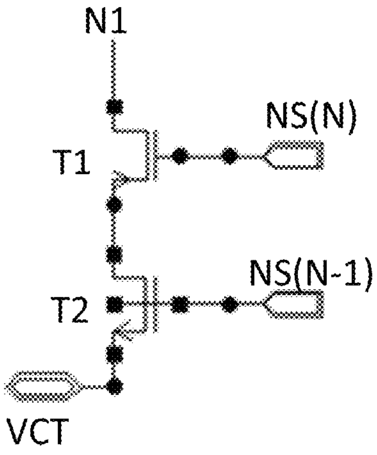
FIG. 8 is a circuit diagram of a gating circuit in a driving circuit according to an embodiment of the present disclosure.

As shown in FIG. 8, the gating circuit may include a first transistor T1 and a second transistor T2;

The gate electrode of the first transistor T1 is electrically connected to the Nth stage of driving signal output terminal NS(N), the drain electrode of the first transistor T1 is electrically connected to the first node N1, and the source electrode of the first transistor T1 is electrically connected to the source electrode of the second transistor T2;

The gate electrode of the second transistor T2 is electrically connected to the (N−1)th stage of driving signal output terminal NS(N−1), and the drain electrode of the second transistor T2 is electrically connected to the gating input terminal VCT; T1 is a p-type transistor, and T2 is an n-type transistor.

Figure 9:
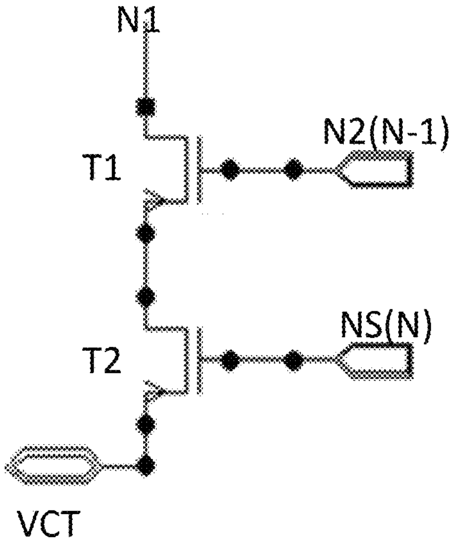
FIG. 9 is a circuit diagram of a gating circuit in a driving circuit according to an embodiment of the present disclosure.

As shown in FIG. 9, the gating circuit may include a first transistor T1 and a second transistor T2;

The gate electrode of the first transistor T1 is electrically connected to the (N−1)th stage of third node N3(N−1), the drain electrode of the first transistor T1 is electrically connected to the first node N1, and the source electrode of the first transistor T1 is electrically connected to the drain electrode of the second transistor T2;

The gate electrode of the second transistor T2 is electrically connected to the Nth stage of driving signal output terminal NS(N), and the source electrode of the second transistor T2 is electrically connected to the gating input terminal VCT;

T1 is a p-type transistor, and T2 is a p-type transistor.

In at least one embodiment of the present disclosure, the (N−1)th stage of third node N3(N−1) may be a third node in the (N−1)th stage of driving circuit.

Figure 10:
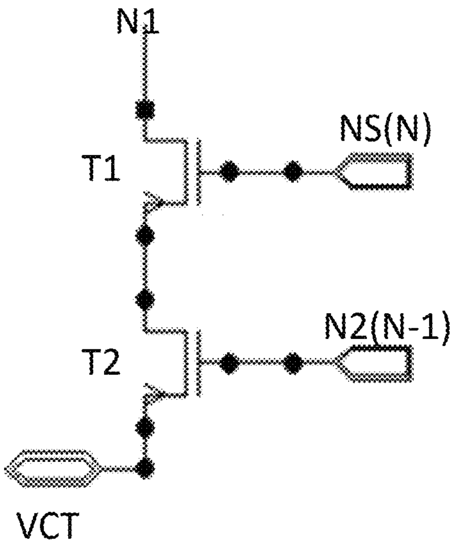
FIG. 10 is a circuit diagram of a gating circuit in a driving circuit according to an embodiment of the present disclosure.

As shown in FIG. 10, the gating circuit may include a first transistor T1 and a second transistor T2;

The gate electrode of the first transistor T1 is electrically connected to the Nth stage of driving signal output terminal NS(N), the drain electrode of the first transistor T1 is electrically connected to the first node N1, and the source electrode of the first transistor T1 is electrically connected to the drain electrode of the second transistor T2;

The gate electrode of the second transistor T2 is electrically connected to the (N−1)th stage of third node N3(N−1), and the source electrode of the second transistor T2 is electrically connected to the gating input terminal VCT:

T1 is a p-type transistor, and T2 is a p-type transistor.

Figure 11:
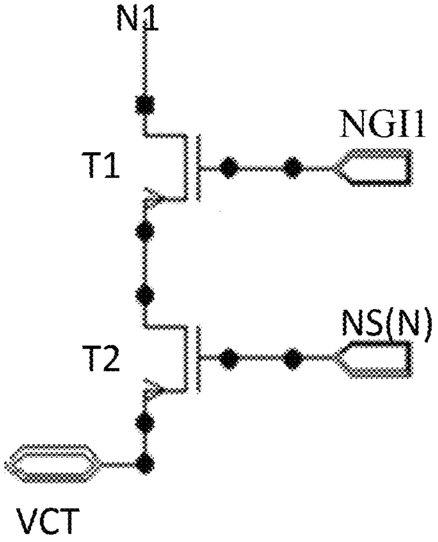
FIG. 11 is a circuit diagram of a gating circuit in a driving circuit according to an embodiment of the present disclosure.

As shown in FIG. 11, the gating circuit may include a first transistor T1 and a second transistor T2;

The gate electrode of the first transistor T1 is electrically connected to a first inverting driving signal terminal NGI1, the drain electrode of the first transistor T1 is electrically connected to the first node N1, and the source electrode of the first transistor T1 is electrically connected to the drain electrode of the second transistor T2; a first inverting driving signal provided by the first inverting driving signal terminal NGI1 and the (N−1)th stage of driving signal provided by the (N−1) the stage of driving signal output terminal NS(N−1) are opposite in phase;

The gate electrode of the second transistor T2 is electrically connected to the Nth stage of driving signal output terminal NS(N), and the source electrode of the second transistor T2 is electrically connected to the gating input terminal VCT;

T1 is a p-type transistor, and T2 is a p-type transistor.

Figure 12:
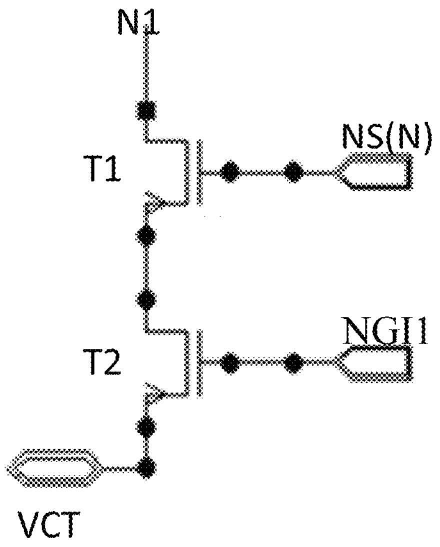
FIG. 12 is a circuit diagram of a gating circuit in a driving circuit according to an embodiment of the present disclosure.

As shown in FIG. 12, the gating circuit may include a first transistor T1 and a second transistor T2;

The gate electrode of the first transistor T1 is electrically connected to the Nth stage of driving signal output terminal NS(N), the drain electrode of the first transistor T1 is electrically connected to the first node N1, and the source electrode of the first transistor T1 is electrically connected to the drain electrode of the second transistor T2;

The gate electrode of the second transistor T2 is electrically connected to the first inverting driving signal terminal NGI1, and the source electrode of the second transistor T2 is electrically connected to the gating input terminal VCT; the first inverting driving signal provided by first inverting driving signal terminal NGI1 and the (N−1)th stage of driving signal provided by the (N−1)th stage of driving signal output terminal NS(N−1) are opposite in phase;

T1 is a p-type transistor, and T2 is a p-type transistor.

Figure 13:
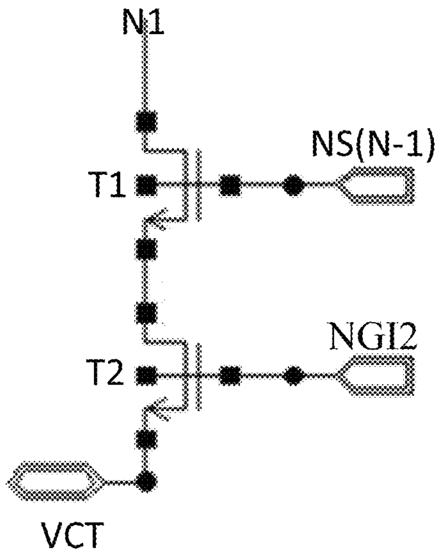
FIG. 13 is a circuit diagram of a gating circuit in a driving circuit according to an embodiment of the present disclosure.

As shown in FIG. 13, the gating circuit may include a first transistor T1 and a second transistor T2;

The gate electrode of the first transistor T1 is electrically connected to the (N−1)th stage driving signal output terminal NS(N−1), the source electrode of the first transistor T1 is electrically connected to the first node N1, and the drain electrode of the first transistor T1 is electrically connected to the source electrode of the second transistor T2;

The gate electrode of the second transistor T2 is electrically connected to a second inverting driving signal terminal NGI2, and the drain electrode of the second transistor T2 is electrically connected to the gating input terminal VCT; the second inverting driving signal provided by the second inverting driving signal terminal NGI2 and the Nth stage of driving signal provided by the Nth stage of driving signal output terminal NS(N) are opposite in phase;

T1 is an n-type transistor, and T2 is an n-type transistor.

Figure 14:
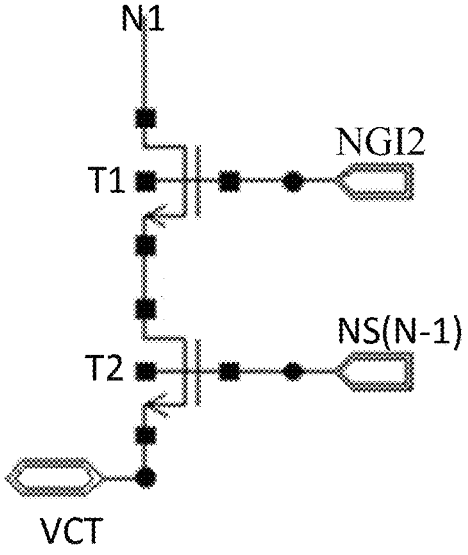
FIG. 14 is a circuit diagram of a gating circuit in a driving circuit according to an embodiment of the present disclosure.

As shown in FIG. 14, the gating circuit may include a first transistor T1 and a second transistor T2;

The gate electrode of the first transistor T1 is electrically connected to the second inverting driving signal terminal NGI2, the source electrode of the first transistor T1 is electrically connected to the first node N1, and the drain electrode of the first transistor T1 is electrically connected to the source electrode of the second transistor T2; the second inverting driving signal provided by the second inverting driving signal terminal NGI2 and the Nth stage of driving signal provided by the Nth stage of driving signal output terminal NS(N) are opposite in phase;

The gate electrode of the second transistor T2 is electrically connected to the (N−1)th stage of driving signal output terminal NS(N−1), and the drain electrode of the second transistor T2 is electrically connected to the gating input terminal VCT;

T1 is an n-type transistor, and T2 is an n-type transistor.

Figure 15:
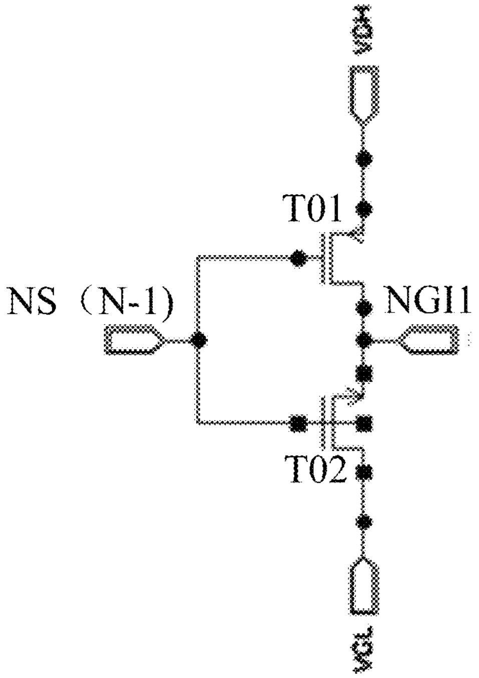
FIG. 15 is a circuit diagram of an inverter according to an embodiment of the present disclosure.

As shown in FIG. 15, the (N−1)th stage of driving signal provided by the (N−1)th stage of driving signal output terminal NS(N−1) can be inverted by the first inverter to obtain the first inverting driving signal provided by the first inverting driving signal terminal NGI1;

The first inverter includes a first inversion control transistor T01 and a second inversion control transistor T02;

T01 is a p-type transistor, and T02 is an n-type transistor.

Figure 16:
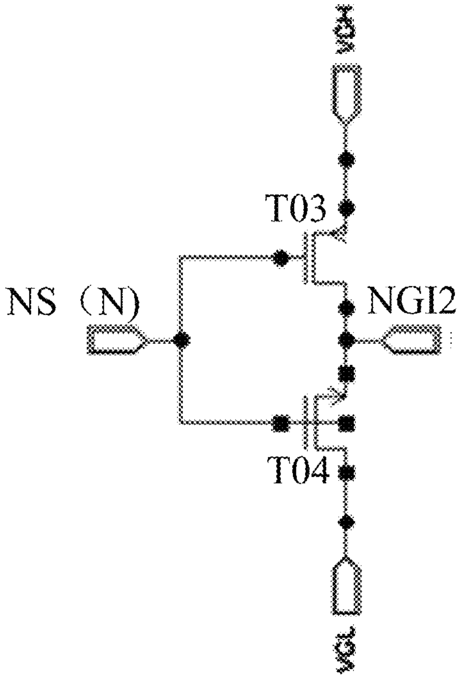
FIG. 16 is a circuit diagram of an inverter according to at least one embodiment of the present disclosure.

As shown in FIG. 16, the Nth stage of driving signal provided by the Nth stage of driving signal output terminal NS(N) can be inverted by the second inverter to obtain the second inverting driving signal provided by the second inverting driving signal terminal NGI2;

The second inverter includes a third inversion control transistor T03 and a fourth inversion control transistor T04;

T03 is a p-type transistor, and T04 is an n-type transistor.

Optionally, the output control circuit includes a third transistor:

A gate electrode of the third transistor is electrically connected to the first node, a first electrode of the third transistor is electrically connected to the first control node, and a second electrode of the third transistor is electrically connected to the second node;

The voltage control circuit includes a first capacitor;

A first terminal of the first capacitor is electrically connected to the first node, and a second terminal of the first capacitor is electrically connected to the second node.

The driving circuit described in at least one embodiment of the present disclosure further includes a second node control circuit;

The second node control circuit is electrically connected to a third control node, the second node and the first voltage terminal, and is configured to control to connect the second node and the first voltage terminal under the control of a potential of the third control node.

In specific implementation, the driving circuit may also include a second node control circuit;

The second node control circuit controls to connect the second node and the first voltage terminal under the control of the potential of the third control node.

Figure 17:
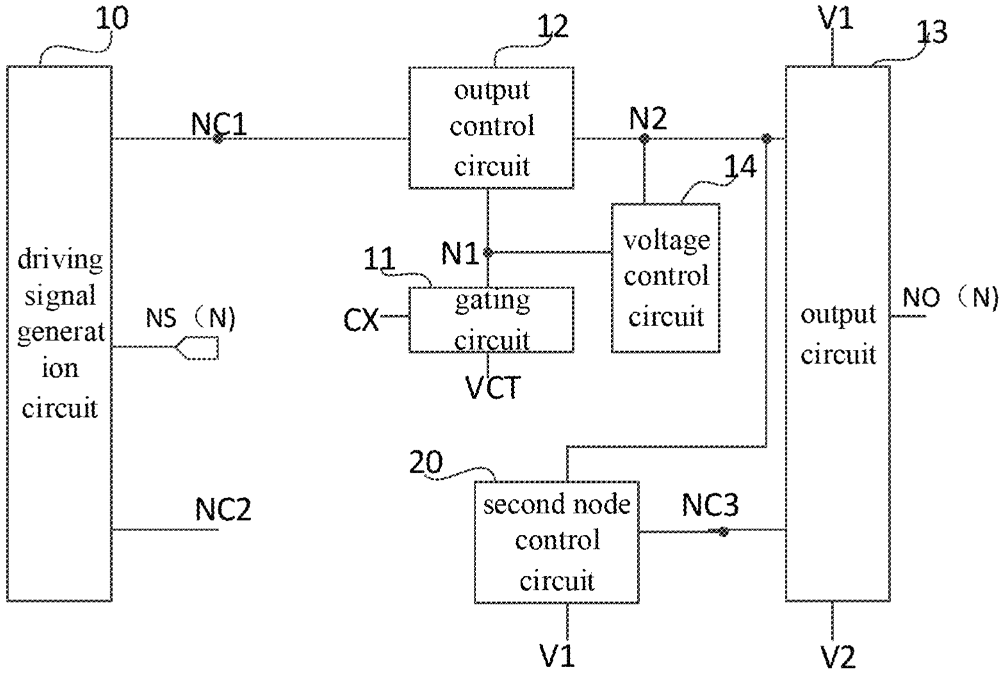
FIG. 17 is a structural diagram of a driving circuit according to at least one embodiment of the present disclosure.

As shown in FIG. 17, on the basis of the embodiment of the driving circuit shown in FIG. 1, the driving circuit further includes a second node control circuit 20;

The second node control circuit 20 is electrically connected to the third control node NC3, the second node N2 and the first voltage terminal V1, and is configured to control to connect the second node N2 and the first voltage terminal V1 under the control of the potential of the third control node NC13.

When at least one embodiment of the driving circuit shown in FIG. 17 is in operation, when the potential of the third control node NC3 is a valid voltage, the potential of the second node N2 may be the first voltage.

Optionally, the second node control circuit includes a fourth transistor:

A gate electrode of the fourth transistor is electrically connected to the third control node, a first electrode of the fourth transistor is electrically connected to the second node, and a second electrode of the fourth transistor is connected to the first voltage terminal.

Optionally, the output circuit includes a fifth transistor, a sixth transistor and a second capacitor;

A gate electrode of the fifth transistor is electrically connected to the second node, a first electrode of the fifth transistor is electrically connected to the first voltage terminal, and a second electrode of the fifth transistor is electrically connected to the output driving terminal;

A gate electrode of the sixth transistor is electrically connected to the third control node, a first electrode of the sixth transistor is electrically connected to the output driving terminal, and a second electrode of the sixth transistor is connected to the second voltage terminal;

A first terminal of the second capacitor is electrically connected to the second node, and a second terminal of the second capacitor is electrically connected to the first voltage terminal.

The driving circuit described in at least one embodiment of the present disclosure further includes an initialization circuit;

The initialization circuit is electrically connected to an initial control terminal, the second voltage terminal and the first node, and is configured to control to connect the first node and the second voltage under the control of an initial control signal provided by the initial control terminal.

In specific implementation, the driving circuit may also include an initialization circuit. When the display device is powered on, the initialization circuit controls to connect the first node and the second voltage terminal under the control of the initial control signal, so as to control the potential of the first node to be a second voltage, and the output control circuit controls to connect the first control node and the second node under the control of the potential of the first node.

In at least one embodiment of the present disclosure, the driving circuit further includes a first node control circuit;

The first node control circuit is electrically connected to a fourth node, the second voltage terminal and the first node, and is configured to control to connect the first node and the second voltage terminal under the control of the potential of the fourth node.

In a specific implementation, the driving circuit may further include a first node control circuit, and the first node control circuit controls to connect the first node and the second voltage terminal under the control of the potential of the fourth node; After the supply phase of the Nth stage of driving signal, when the potential of the fourth node is a valid voltage, the first node control circuit controls to connect the first node and the second voltage terminal, so that the potential of the first node is the second voltage, the output control circuit controls to connect the first control node and the second node under the control of the potential of the first node.

In at least one embodiment of the present disclosure, when the transistor included in the first node control circuit is a p-type transistor, the valid voltage may be a low voltage, and when the transistor included in the first node control circuit is an n-type transistor, the valid voltage may be a high voltage.

Figure 18:
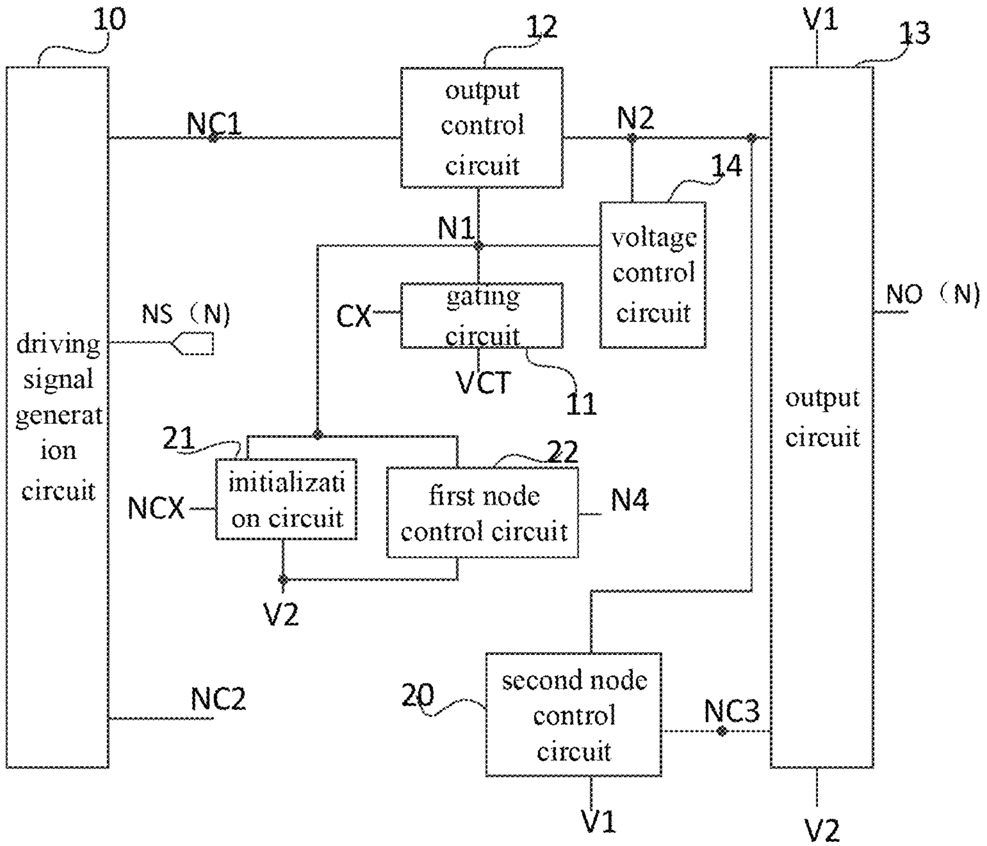
FIG. 18 is a structural diagram of a driving circuit according to at least one embodiment of the present disclosure.

As shown in FIG. 18, on the basis of at least one embodiment of the driving circuit shown in FIG. 17, the driving circuit may further include an initialization circuit 21 and a first node control circuit 22;

The initialization circuit 21 is electrically connected to the initial control terminal NCX, the first node N1 and the second voltage terminal V2 respectively, and is configured to control to connect the first node N1 and the second voltage terminal V2 under the control of the initial control signal provided by the initial control terminal NCX;

The first node control circuit 22 is electrically connected to the fourth node N4, the first node N1 and the second voltage terminal V2 respectively, and is configured to control to connect the first node N1 and the second voltage terminal V2 under the control of the potential of the fourth node N4.

Optionally, the initialization circuit includes a seventh transistor;

A gate electrode of the seventh transistor is electrically connected to the initial control terminal, a first electrode of the seventh transistor is electrically connected to the first node, and a second electrode of the seventh transistor is electrically connected to the second voltage terminal.

Optionally, the first node control circuit includes an eighth transistor:

A gate electrode of the eighth transistor is electrically connected to the fourth node, a first electrode of the eighth transistor is electrically connected to the first node, and a second electrode of the eighth transistor is electrically connected to the second voltage terminal.

The driving circuit according to at least one embodiment of the present disclosure further includes a third control node control circuit;

The third control node control circuit is respectively electrically connected to the first node, a fifth node, the second control node, a third control node and a sixth node, and is configured to control to connect the fifth node and the third control node under the control of the potential of the first node, and control to connect the second control node and the sixth node under the control of the potential of the sixth node, and control to connect the sixth node and the third control node.

In a specific implementation, the driving circuit may include a third control node control circuit, and the third control node control circuit controls the potential of the third control node under the control of the potential of the first node and the potential of the sixth node.

Figure 19:
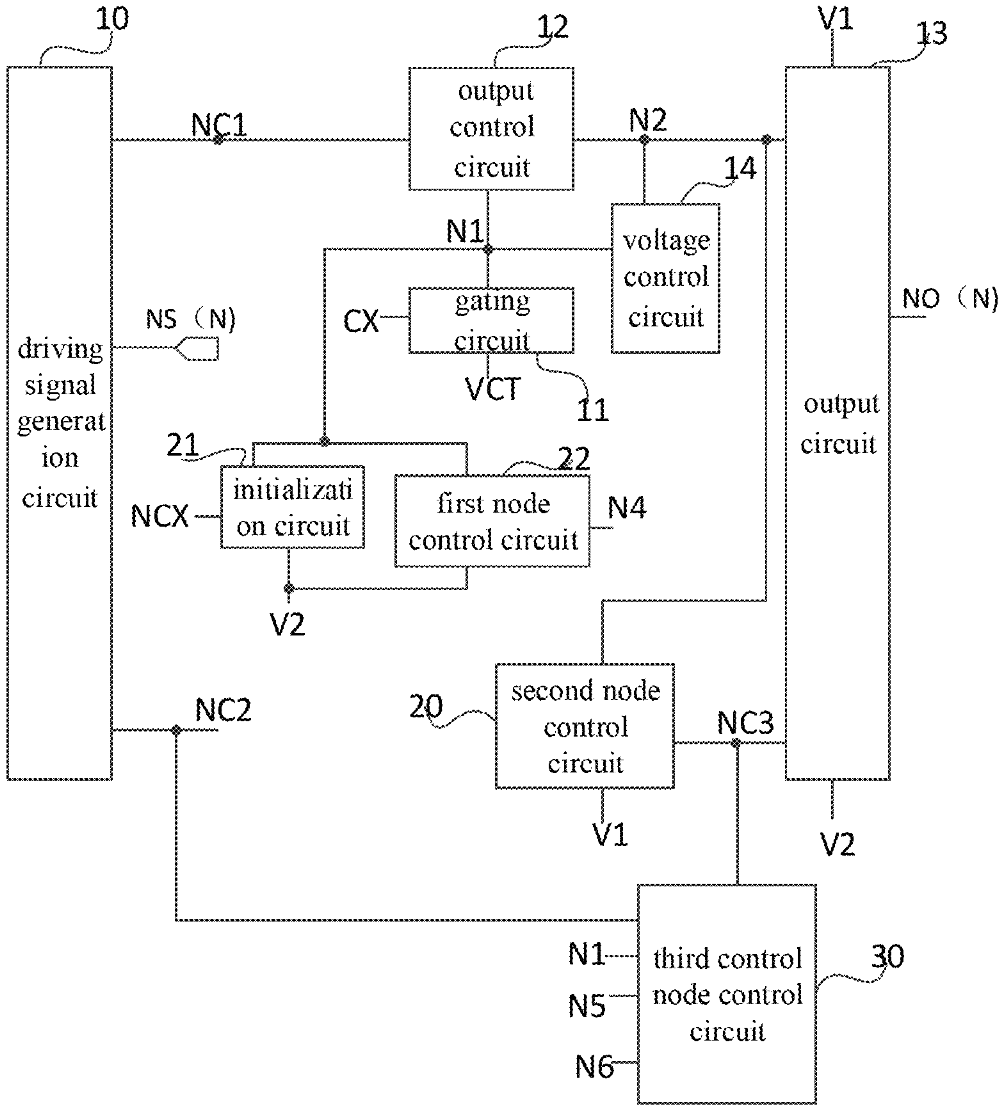
FIG. 19 is a structural diagram of a driving circuit according to at least one embodiment of the present disclosure.

As shown in FIG. 19, on the basis of at least one embodiment of the driving circuit shown in FIG. 18, the driving circuit further includes a third control node control circuit 30;

The third control node control circuit 30 is respectively electrically connected to the first node N1, the fifth node N5, the second control node NC2, the third control node NC3 and the sixth node N6, is configured to control to connect the fifth node N5 and the third control node NC3 under the control of the potential of the first node N1, and control to connect the second control node NC2 and the sixth node N6 under the control of the potential of the sixth node N6, and control to connect the sixth node N6 and the third control node NC3.

Optionally, the third control node control circuit includes a ninth transistor, a tenth transistor, and an eleventh transistor, A gate electrode of the ninth transistor is electrically connected to the first node, a first electrode of the ninth transistor is electrically connected to the fifth node, and a second electrode of the ninth transistor is electrically connected to the third control node;

A gate electrode of the tenth transistor and a second electrode of the tenth transistor are both electrically connected to the sixth node, and a first electrode of the tenth transistor is electrically connected to the second control node;

Both a gate electrode of the eleventh transistor and a first electrode of the eleventh transistor are electrically connected to the sixth node, and a second electrode of the eleventh transistor is electrically connected to the third control node.

In at least one embodiment of the present disclosure, the driving signal generation circuit includes a first driving output circuit, a second driving output circuit, a first control node control circuit, and a second control node control circuit;

The first control node control circuit is configured to control the potential of the first control node;

The second control node control circuit is configured to control the potential of the second control node;

The first driving output circuit is electrically connected to the first control node, the first voltage terminal and the Nth stage of driving signal output terminal, and is configured to control to connect the Nth stage of driving signal output terminal and the first voltage terminal under the control of the potential of the first control node;

The second driving output circuit is electrically connected to the second control node, the second voltage terminal and the Nth stage of driving signal output terminal, and is configured to control to connect the Nth stage of driving signal output terminal and the second voltage terminal under the control of the potential of the second control node.

Figure 20:
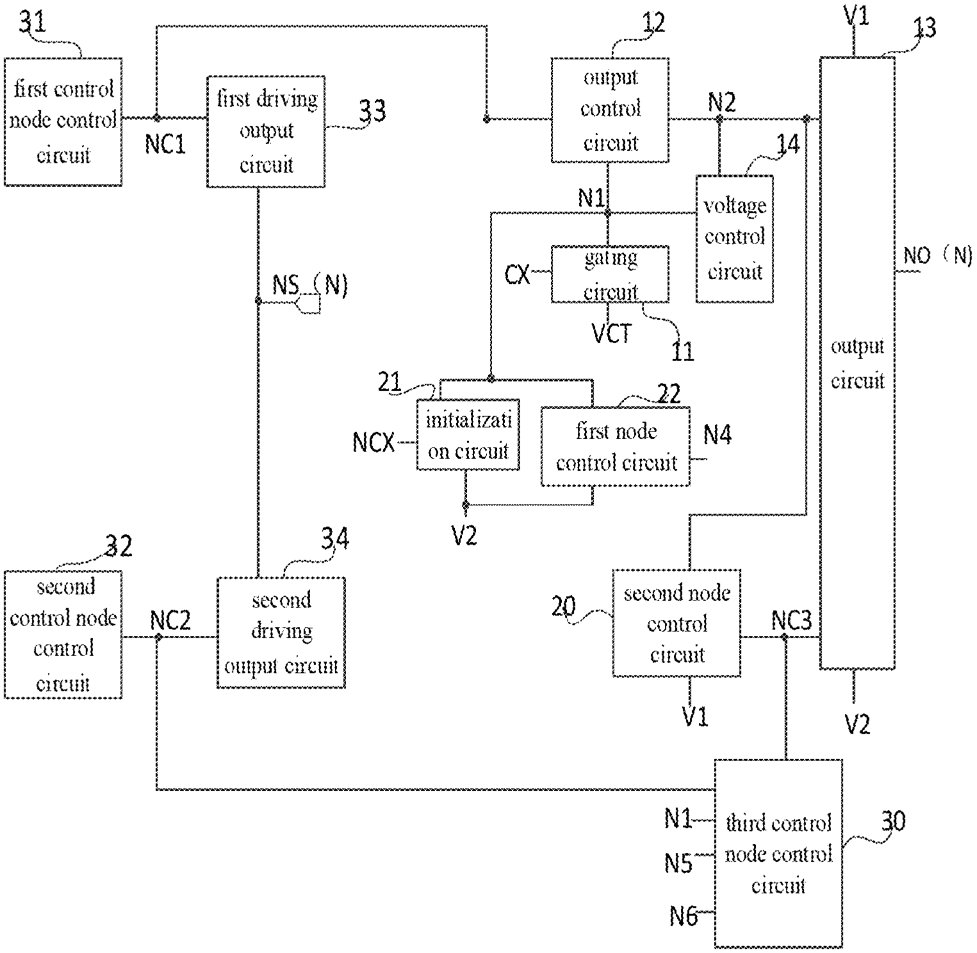
FIG. 20 is a structural diagram of a driving circuit according to at least one embodiment of the present disclosure.

As shown in FIG. 20, on the basis of at least one embodiment of the driving circuit shown in FIG. 19, the driving circuit further includes a first control node control circuit 31, a second control node control circuit 32, a first driving output circuit 33 and the second driving output circuit 34;

The first control node control circuit 31 is electrically connected to the first control node NC1 and is configured to control the potential of the first control node NC1;

The second control node control circuit 32 is electrically connected to the second control node NC2 and is configured to control the potential of the second control node NC2;

The first driving output circuit 33 is electrically connected to the first control node NC1, the first voltage terminal V1, and the Nth stage of driving signal output terminal NS(N), and is configured to control to connect the Nth stage of driving signal output terminal NS(N) and the first voltage terminal V1 under the control of the potential of the first control node NC1;

The second driving output circuit 34 is electrically connected to the second control node NC2, the Nth stage of driving signal output terminal NS(N) and the second voltage terminal V2, and is configured to control to connect the Nth stage of driving signal output terminal NS(N) and the second voltage terminal V2 under the control of the potential of the second control node NC2.

In at least one embodiment of the present disclosure, the first control node control circuit includes a seventh node control circuit, an eighth node control circuit, a third node control circuit, and a first control circuit;

The seventh node control circuit is electrically connected to a seventh node, the second voltage terminal, a first clock signal terminal and a fifth node, and is configured to control to connect the seventh node and the second voltage terminal under the control of a first clock signal provided by the first clock signal terminal, and control to connect the seventh node and the first clock signal terminal under the control of a potential of the fifth node;

The eighth node control circuit is electrically connected to the second voltage terminal, a seventh node, and an eighth node, and is configured to control to connect the seventh node and the eighth node under the control of a second voltage signal provided by the second voltage terminal;

The third node control circuit is electrically connected to the eighth node, the second clock signal terminal and the third node, and is configured to control to connect the third node and the second clock signal terminal under the control of the potential of the eighth node, and control the potential of the third node according to the potential of the eighth node;

The first control circuit is electrically connected to the second clock signal terminal, the third node, the first control node, the fifth node and the first voltage terminal, and is configured to control to connect the third node and the first control node under the control of a second clock signal provided by the second clock signal terminal, and control to connect the first control node and the first voltage terminal under the control of the potential of the fifth node.

In specific implementation, the first control node control circuit may include a seventh node control circuit, an eighth node control circuit, a third node control circuit and a first control circuit; the seventh node control circuits controls the potential of the seventh node under the control of the first clock signal and the potential of the fifth node; the eighth node control circuit controls to connect the seventh node and the eighth node under the control of the second voltage signal; the third node control circuit controls to connect the third node and the second clock signal terminal under the control of the potential of the eighth node, and control the potential of the third node according to the potential of the eighth node; the first control circuit controls to connect the third node and the first control node under the control of the second clock signal, and control to connect the first control node and the first voltage terminal under the control of the potential of the fifth node.

In at least one embodiment of the present disclosure, the second control node control circuit includes a sixth node control circuit, a fifth node control circuit, a ninth node control circuit, a fourth node control circuit, and a second control circuit;

The sixth node control circuit is electrically connected to the second voltage terminal, a ninth node, the sixth node, and a fourth node, and is configured to control to connect the ninth node and the sixth node under the control of the second voltage signal provided by the second voltage terminal, and control the potential of the sixth node according to the potential of the fourth node;

The fifth node control circuit is respectively electrically connected to the (N−1)th stage of driving signal output terminal, the first clock signal terminal, a fifth node, the initial control terminal and the first voltage terminal, is configured to control to connect the fifth node and the (N−1)th stage of driving signal output terminal under the control of the first clock signal provided by the first clock signal terminal, and control to connect the fifth node and the first voltage terminal under the control of the initial control signal provided by the initial control terminal;

The ninth node control circuit is electrically connected to the first clock signal terminal, the (N−1)th stage of driving signal output terminal and the ninth node respectively, and is configured to control to connect the ninth node and the (N−1)th stage of driving signal output terminal under the control of the first clock signal provided by the first clock signal terminal;

The fourth node control circuit is electrically connected to the seventh node, the first voltage terminal, the fourth node, the second clock signal terminal and the sixth node, and is configured to control to connect the fourth node and the first voltage terminal under the control of the potential of the seventh node, and control to connect the fourth node and the second clock signal terminal under the control of the potential of the sixth node;

The second control circuit is electrically connected to the second voltage terminal, the fifth node and the second control node, and is configured to control to connect the fifth node and the second control node under the control of the second voltage signal provided by the second voltage terminal.

In specific implementation, the second control node control circuit may include a sixth node control circuit, a fifth node control circuit, a ninth node control circuit, a fourth node control circuit and a second control circuit: the fourth node control circuit controls the potential of the fourth node under the control of the potential of the seventh node and the potential of the sixth node; the sixth node control circuit controls to connect the ninth node and the sixth node under the control of the second voltage signal, and control the potential of the sixth node according to the potential of the fourth node: the fifth node control circuit controls to connect the fifth node and the (N−1)th stage driving signal output terminal under the control of the first clock signal, control to connect the fifth node and the first voltage terminal under the control of the initial control signal; the ninth node control circuit controls to connect the ninth node and the (N−1)th stage of driving signal output terminal under the control of the first clock signal; the fourth node control circuit controls to connect the fourth node and the first voltage terminal under the control of the potential of the seventh node, and controls to connect the fourth node and the second clock signal terminal under the control of the potential of the sixth node; the second control circuit controls to connect the fifth node and the second control node under the control of the second voltage signal.

Figure 21:
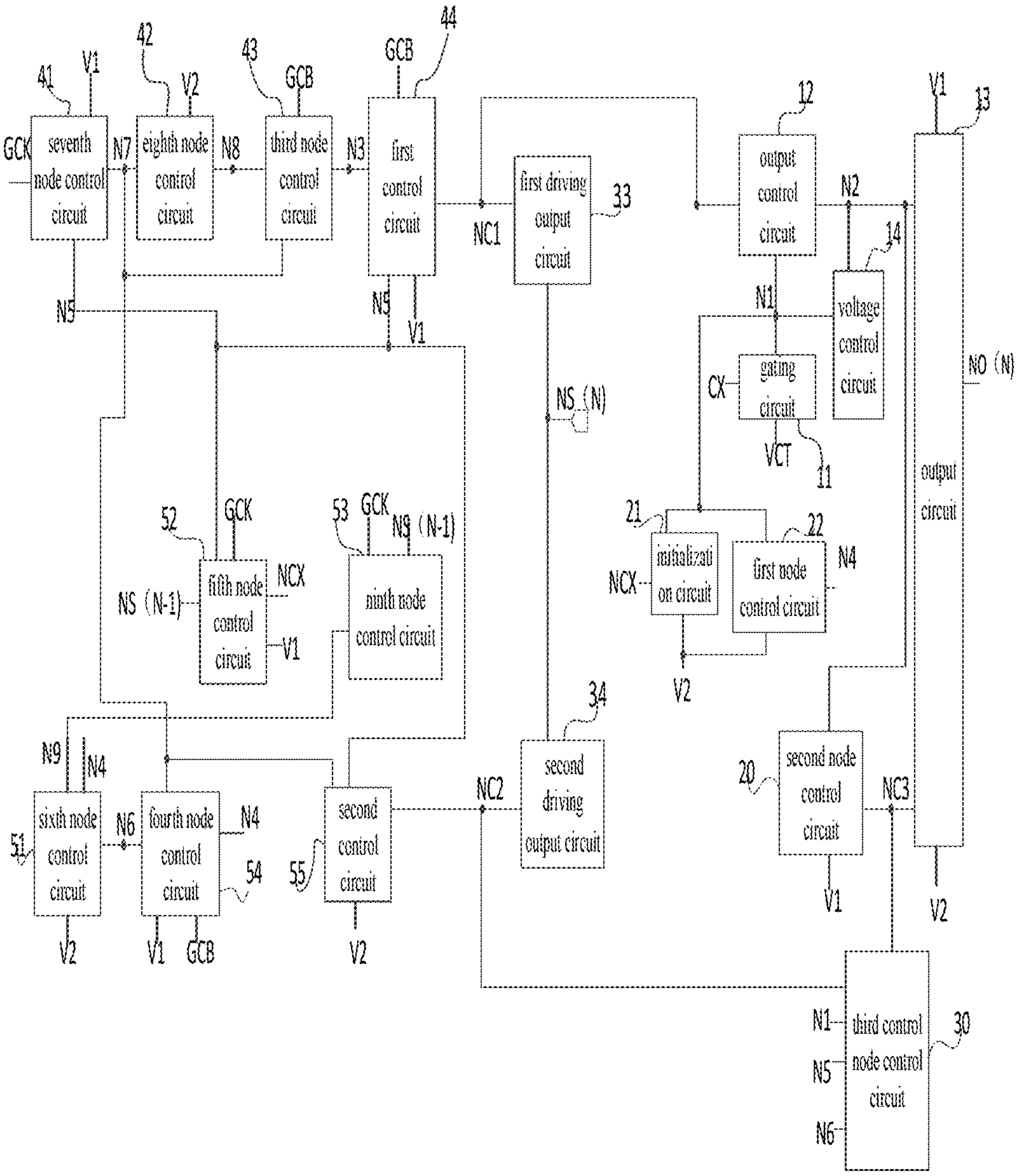
FIG. 21 is a structural diagram of a driving circuit according to at least one embodiment of the present disclosure.

As shown in FIG. 21, on the basis of at least one embodiment of the driving circuit shown in FIG. 20, the first control node control circuit includes a seventh node control circuit 41, an eighth node control circuit 42, a third node control circuit 43 and a first control circuit 44;

The seventh node control circuit 41 is respectively electrically connected to the seventh node N7, the second voltage terminal V2, the first clock signal terminal GCK and the fifth node N5, and is configured to control to connect the seventh node N7 and the second voltage terminal V2 under the control of the first clock signal provided by the first clock signal terminal GCK, and control to connect the seventh node N7 and the first clock signal terminal GCK under the control of the potential of the fifth node N5;

The eighth node control circuit 42 is electrically connected to the second voltage terminal V2, the seventh node N7 and the eighth node N8 respectively, and is configured to control to connect the seventh node N7 and the eighth node N8 under the control of the second voltage signal provided by the second voltage terminal V2;

The third node control circuit 43 is electrically connected to the eighth node N8, the second clock signal terminal GCB and the third node N9 respectively, and is configured to control to connect the third node N9 and the second clock signal terminal GCB under the control of the potential of the eighth node N8, and controls the potential of the third node N9 according to the potential of the eighth node N8;

The first control circuit 44 is respectively electrically connected to the second clock signal terminal GCB, the third node N9, the first control node NC1, the fifth node N5 and the first voltage terminal V1, is configured to control to connect the third node N9 and the first control node NC1 under the control of the second clock signal provided by the second clock signal terminal GCB, and control to connect the first control node NC1 and the first voltage terminal V1 under the control of the potential of the fifth node N5;

The second control node control circuit includes a sixth node control circuit 51, a fifth node control circuit 52, a ninth node control circuit 53, a fourth node control circuit 54 and a second control circuit 55;

The sixth node control circuit 51 is electrically connected to the second voltage terminal V2, the ninth node N9, the sixth node N6 and the fourth node N4 respectively, and is configured to control to connect the ninth node N9 and the sixth node N6 under the control of the second voltage signal provided by the second voltage terminal V2, and control the potential of the sixth node N6 according to the potential of the fourth node N4;

The fifth node control circuit 52 is electrically connected to the (N−I)th stage of driving signal output terminal NS(N−1), the first clock signal terminal GCK, the fifth node N5, the initial control terminal NCX and the first voltage terminal V1, respectively, is configured to control to connect the fifth node N5 and the (N−I)th stage of driving signal output terminal NS(N−1) under the control of the first clock signal provided by the first clock signal terminal GCK, to control to connect the fifth node N5 and the first voltage terminal V1 under the control of the initial control signal provided by the initial control terminal NCX;

The ninth node control circuit 53 is electrically connected to the first clock signal terminal GCK, the (N−1)th stage of driving signal output terminal NS(N-1) and the ninth node N9, is configured to control to connect the ninth node N9 and the (N−1)th stage of driving signal output terminal NS(N−1) under the control of the first clock signal provided by the first clock signal terminal GCK;

The fourth node control circuit 54 is respectively electrically connected to the seventh node N7, the first voltage terminal V1, the sixth node N6, the fourth node N4 and the second clock signal terminal GCB, is configured to control to connect the fourth node N4 and the first voltage terminal V1 under the control of the potential of the seventh node N7, and control to connect the fourth node N4 and the second clock signal terminal GCB under the control of the potential of the sixth node N6;

The second control circuit 55 is respectively electrically connected to the second voltage terminal V2, the fifth node N5 and the second control node NC2, and is configured to control to connect the fifth node N5 and the second control node NC2 under the control of the second voltage signal provided by the second voltage terminal V2.

Optionally, the seventh node control circuit includes a twelfth transistor and a thirteenth transistor, the eighth node control circuit includes a fourteenth transistor, and the third node control circuit includes a fifteenth transistor and a third transistor, the first control circuit includes a sixteenth transistor and a seventeenth transistor;

A gate electrode of the twelfth transistor is electrically connected to the first clock signal terminal, a first electrode of the twelfth transistor is electrically connected to the second voltage terminal, and a second electrode of the twelfth transistor is electrically connected to the seventh node;

A gate electrode of the thirteenth transistor is electrically connected to the fifth node, a first electrode of the thirteenth transistor is electrically connected to the seventh node, and a second electrode of the thirteenth transistor is electrically connected to the first clock signal terminal;

A gate electrode of the fourteenth transistor is electrically connected to the second voltage terminal, a first electrode of the fourteenth transistor is electrically connected to the seventh node, and a second electrode of the fourteenth transistor is electrically connected to the eighth node:

A gate electrode of the fifteenth transistor is electrically connected to the eighth node, a first electrode of the fifteenth transistor is electrically connected to the second clock signal terminal, and a second electrode of the fifteenth transistor is electrically connected to the third node;

A gate electrode of the sixteenth transistor is electrically connected to the second clock signal terminal, a first electrode of the sixteenth transistor is electrically connected to the third node, and a second electrode of the sixteenth transistor is electrically connected to the first control node;

A gate electrode of the seventeenth transistor is electrically connected to the fifth node, a first electrode of the seventeenth transistor is electrically connected to the first control node, and a second electrode of the seventeenth transistor is electrically connected to the first voltage terminal.

Optionally, the sixth node control circuit includes an eighteenth transistor and a fourth capacitor, the fifth node control circuit includes a nineteenth transistor and a twentieth transistor, and the ninth node control circuit includes a twenty-first transistor. the fourth node control circuit includes a twenty-second transistor and a twenty-third transistor, and the second control circuit includes a twenty-fourth transistor;

A gate electrode of the eighteenth transistor is electrically connected to the second voltage terminal, a first electrode of the eighteenth transistor is electrically connected to the ninth node, and a second electrode of the eighteenth transistor is electrically connected to the sixth node:

A first terminal of the fourth capacitor is electrically connected to the fourth node, and a second terminal of the fourth capacitor is electrically connected to the sixth node;

A gate electrode of the nineteenth transistor is electrically connected to the first clock signal terminal, a first electrode of the nineteenth transistor is electrically connected to the (N−1)th stage of driving signal output terminal, and a second electrode of the nineteenth transistor is electrically connected to the fifth node;

A gate electrode of the twentieth transistor is electrically connected to the initial control terminal, a first electrode of the twentieth transistor is electrically connected to the first voltage terminal, and a second electrode of the twentieth transistor is electrically connected to the fifth node:

A gate electrode of the twenty-first transistor is electrically connected to the first clock signal terminal, a first electrode of the twenty-first transistor is electrically connected to the (N−1)th stage of driving signal output terminal, and a second electrode of the twenty-first transistor is electrically connected to the ninth node:

A gate electrode of the twenty-second transistor is electrically connected to the seventh node, a first electrode of the twenty-second transistor is electrically connected to the first voltage terminal, and a second electrode of the twenty-second transistor is electrically connected to the fourth node;

A gate electrode of the twenty-third transistor is electrically connected to the sixth node, a first electrode of the twenty-third transistor is electrically connected to the fourth node, and a second electrode of the twenty-third transistor is electrically connected to the second clock signal terminal:

A gate electrode of the twenty-fourth transistor is electrically connected to the second voltage terminal, a first electrode of the twenty-fourth transistor is electrically connected to the ninth node, a second electrode of the twenty-fourth transistor is electrically connected to the second control node.

Optionally, the first driving output circuit includes a twenty-fifth transistor and a fifth capacitor, and the second driving output circuit includes a twenty-sixth transistor and a sixth capacitor;

A gate electrode of the twenty-fifth transistor is electrically connected to the first control node, a first electrode of the twenty-fifth transistor is electrically connected to the first voltage terminal, and a second electrode of the twenty-fifth transistor is electrically connected to the Nth stage of driving signal output terminal;

A first terminal of the fifth capacitor is electrically connected to the first control node, and a second terminal of the fifth capacitor is electrically connected to the first voltage terminal;

A gate electrode of the twenty-sixth transistor is electrically connected to the second control node, a first electrode of the twenty-sixth transistor is electrically connected to the Nth stage of driving signal output terminal, and a second electrode of the twenty-sixth transistor is electrically connected to the second voltage terminal:

A first terminal of the sixth capacitor is electrically connected to the Nth stage of driving signal output terminal, and a second terminal of the sixth capacitor is electrically connected to a second voltage terminal.

Figure 22:
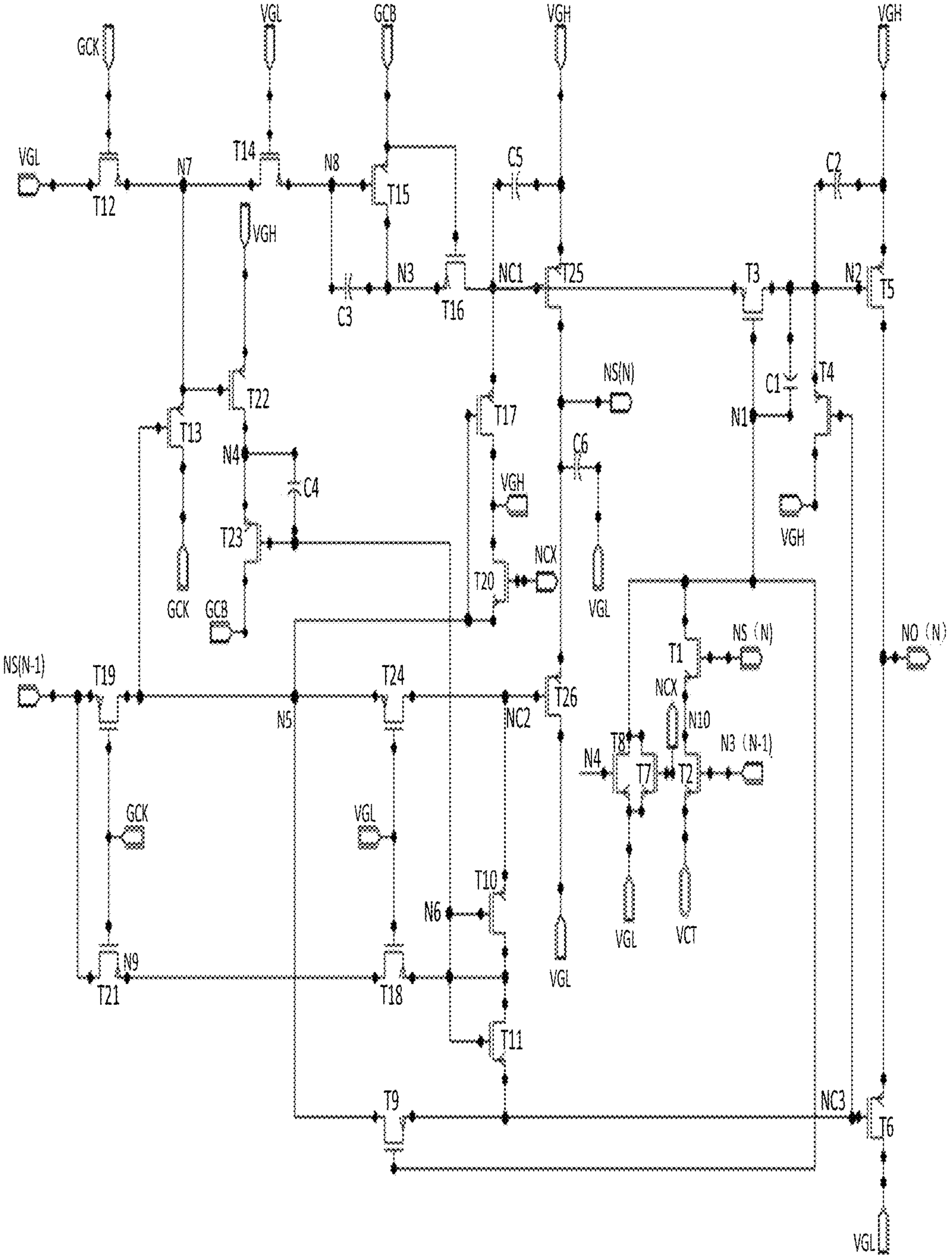
FIG. 22 is a circuit diagram of a driving circuit according to at least one embodiment of the present disclosure.

As shown in FIG. 22, on the basis of at least one embodiment of the driving circuit shown in FIG. 21

The gating circuit includes a first transistor T1 and a second transistor T2;

The gate electrode of the first transistor T1 is electrically connected to the Nth stage of driving signal output terminal NS(N), the drain electrode of the first transistor T1 is electrically connected to the first node N1, and the source electrode of the first transistor T1 is electrically connected to the drain electrode of the second transistor T2;

The gate electrode of the second transistor T2 is electrically connected to the (N−1)th stage of third node N3(N−1), and the source electrode of the second transistor T2 is electrically connected to the gating input terminal VCT;

The output control circuit includes a third transistor T3;

The gate electrode of the third transistor T3 is electrically connected to the first node N1, the source electrode of the third transistor T3 is electrically connected to the first control node NC1, and the drain electrode of the third transistor T3 is electrically connected to the second node N2;

The voltage control circuit includes a first capacitor C1;

A first terminal of the first capacitor C1 is electrically connected to the first node N1, and a second terminal of the first capacitor C1 is electrically connected to the second node N2;

The second node control circuit includes a fourth transistor T4;

The gate electrode of the fourth transistor T4 is electrically connected to the third control node NC3, the source electrode of the fourth transistor T4 is electrically connected to the second node N2, and the drain electrode of the fourth transistor T4 is electrically connected to the high voltage terminal VGH;

The output circuit includes a fifth transistor T5, a sixth transistor and a second capacitor C2;

The gate electrode of the fifth transistor T5 is electrically connected to the second node N3, the source electrode of the fifth transistor T5 is electrically connected to the high voltage terminal VGH, and the drain electrode of the fifth transistor T5 is electrically connected to the output driving Terminal NO (N);

The gate electrode of the sixth transistor T6 is electrically connected to the third control node NC3, the source electrode of the sixth transistor T6 is electrically connected to the output driving terminal NO (N), and the drain electrode of the sixth transistor T6 is electrically connected to the low voltage terminal VGL;

The first terminal of the second capacitor C2 is electrically connected to the second node N2, and the second terminal of the second capacitor C2 is electrically connected to the high voltage terminal VGH;

The initialization circuit includes a seventh transistor T7;

The gate electrode of the seventh transistor T7 is electrically connected to the initial control terminal NCX, the source electrode of the seventh transistor T7 is electrically connected to the first node N1, and the drain electrode of the seventh transistor T7 is connected to the low voltage Terminal VGL;

The first node control circuit includes an eighth transistor T8;

The gate electrode of the eighth transistor T8 is electrically connected to the fourth node N4, the source electrode of the eighth transistor T8 is electrically connected to the first node N1, and the drain electrode of the eighth transistor T8 is electrically connected to the low voltage Terminal VGL;

The third control node control circuit includes a ninth transistor T9, a tenth transistor T10 and an eleventh transistor T11;

The gate electrode of the ninth transistor T9 is electrically connected to the first node N1, the drain electrode of the ninth transistor T9 is electrically connected to the fifth node N5, and the source electrode of the ninth transistor T9 is electrically connected to the third control node NC3;

Both the gate electrode of the tenth transistor T10 and the source electrode of the tenth transistor T10 are electrically connected to the sixth node N6, and the drain electrode of the tenth transistor T10 is electrically connected to the second control node NC2;

Both the gate electrode of the eleventh transistor T11 and the source electrode of the eleventh transistor T11 are electrically connected to the sixth node N6, and the drain electrode of the eleventh transistor T11 is electrically connected to the third control node NC3;

The seventh node control circuit includes a twelfth transistor T12 and a thirteenth transistor T13, the eighth node control circuit includes a fourteenth transistor T14, and the third node control circuit includes a fifteenth transistor T15 and a third capacitor C3, the first control circuit includes a sixteenth transistor T16 and a seventeenth transistor T17;

The gate electrode of the twelfth transistor T12 is electrically connected to the first clock signal terminal GCK, the source electrode of the twelfth transistor T12 is electrically connected to the low voltage terminal VGL, and the drain electrode of the twelfth transistor T12 is electrically connected to the seventh node N7;

The gate electrode of the thirteenth transistor T13 is electrically connected to the fifth node N5, the source electrode of the thirteenth transistor T13 is electrically connected to the seventh node N7, and the drain electrode of the thirteenth transistor T13 is electrically connected to the first clock signal terminal GCK;

The gate electrode of the fourteenth transistor T14 is electrically connected to the low voltage terminal VGL, the source electrode of the fourteenth transistor T14 is electrically connected to the seventh node N7, and the drain electrode of the fourteenth transistor T14 is electrically connected to the eighth node N8;

The gate electrode of the fifteenth transistor T15 is electrically connected to the eighth node N8, the source electrode of the fifteenth transistor T15 is electrically connected to the second clock signal terminal GCB, and the drain electrode of the fifteenth transistor T15 electrically connected to the third node N3;

The gate electrode of the sixteenth transistor T16 is electrically connected to the second clock signal terminal GCB, the source electrode of the sixteenth transistor T16 is electrically connected to the third node N3, and the drain electrode of the sixteenth transistor T16 is electrically connected to the first control node NC1;

The gate electrode of the seventeenth transistor T17 is electrically connected to the fifth node N5, the source electrode of the seventeenth transistor T17 is electrically connected to the first control node NC1, and the drain electrode of the seventeenth transistor T17 is electrically connected to the high voltage Terminal VGH;

The sixth node control circuit includes an eighteenth transistor T18 and a fourth capacitor C4, the fifth node control circuit includes a nineteenth transistor T19 and a twentieth transistor T20, and the ninth node control circuit includes a twenty-first transistor T21, the fourth node control circuit includes a twenty-second transistor T22 and a twenty-third transistor T23, and the second control circuit includes a twenty-fourth transistor T24;

The gate electrode of the eighteenth transistor T18 is electrically connected to the low voltage terminal VGL, the source electrode of the eighteenth transistor T18 is electrically connected to the ninth node N9, and the drain electrode of the eighteenth transistor T18 is electrically connected to the sixth node N6;

A first terminal of the fourth capacitor C4 is electrically connected to the fourth node N4, and a second terminal of the fourth capacitor C4 is electrically connected to the sixth node N6;

The gate electrode of the nineteenth transistor T19 is electrically connected to the first clock signal terminal GCK, and the source electrode of the nineteenth transistor T19 is electrically connected to the (N−1)th stage of driving signal output terminal NS(N−1), the drain electrode of the nineteenth transistor T19 is electrically connected to the fifth node N5;

The gate electrode of the twentieth transistor T20 is electrically connected to the initial control terminal NCX, the source electrode of the twentieth transistor T20 is electrically connected to the high voltage terminal VGH, and the drain electrode of the twentieth transistor T20 is electrically connected to the fifth node N5;

The gate electrode of the twenty-first transistor T21 is electrically connected to the first clock signal terminal GCK, and the source electrode of the twenty-first transistor T21 is electrically connected to the (N−1)th stage of driving signal output terminal NS(N−1), the drain electrode of the twenty-first transistor T21 is electrically connected to the ninth node N9;

The gate electrode of the twenty-second transistor T22 is electrically connected to the seventh node N7, the source electrode of the twenty-second transistor T22 is electrically connected to the high voltage terminal VGH, and the drain electrode of the twenty-second transistor T22 is electrically connected to the fourth node N4;

The gate electrode of the twenty-third transistor T23 is electrically connected to the sixth node N6, the source electrode of the twenty-third transistor T23 is electrically connected to the fourth node N4, and the drain electrode of the twenty-third transistor T23 is electrically connected to the second clock signal terminal GCB;

The gate electrode of the twenty-fourth transistor T24 is electrically connected to the low voltage terminal VGL, the source electrode of the twenty-fourth transistor T24 is electrically connected to the ninth node N9, and the drain electrode of the twenty-fourth transistor T24 is electrically connected to the second control node NC2;

The first driving output circuit includes a twenty-fifth transistor T25 and a fifth capacitor C5, and the second driving output circuit includes a twenty-sixth transistor T26 and a sixth capacitor C6;

The gate electrode of the twenty-fifth transistor T25 is electrically connected to the first control node NC, the source electrode of the twenty-fifth transistor T25 is electrically connected to the high voltage terminal VGH, and the drain electrode of the twenty-fifth transistor T25 is electrically connected to the Nth stage of driving signal output terminal NS(N);

A first terminal of the fifth capacitor C5 is electrically connected to the first control node NC1, and a second terminal of the fifth capacitor C5 is electrically connected to the high voltage terminal VGH;

The gate electrode of the twenty-sixth transistor T26 is electrically connected to the second control node NC2, the source electrode of the twenty-sixth transistor T26 is electrically connected to the Nth stage of driving signal output terminal NS(N), and the drain electrode of the twenty-sixth transistor T26 is electrically connected to the low voltage terminal VGL:

A first terminal of the sixth capacitor C6 is electrically connected to the Nth stage of driving signal output terminal NS(N), and a second terminal of the sixth capacitor C6 is electrically connected to the low voltage terminal VGL.

In at least one embodiment of the driving circuit shown in FIG. 22, all transistors are p-type transistors, but not limited thereto.

In at least one embodiment of the driving circuit shown in FIG. 22, the first voltage terminal is a high voltage terminal, and the second voltage terminal is a low voltage terminal, but not limited thereto.

In at least one embodiment of the driving circuit shown in FIG. 22, all transistors are p-type transistors, but not limited thereto.

In at least one embodiment of the driving circuit shown in FIG. 22, N10 is the tenth node.

In at least one embodiment of the present disclosure, the structure of the driving signal generating circuit is not limited to that shown in FIG. 22, the driving signal generation circuit maybe 16T3C circuit, 13T3C circuit, 12T3C circuit, 10T3C circuit, which is not limited.

When at least one embodiment of the driving circuit shown in FIG. 22 of the present disclosure is in operation, In the first phase, when NS (N−1) outputs a low voltage signal, GCK outputs a low voltage signal, and GCB outputs a high voltage signal. T19 and T21 are turned on to pull down the potential of N5 and the potential of N9, T24 and T18 are turned on to pull down the potential of NC2 and the potential of N6, T26 is turned on; the potential of N6 is low voltage, to ensure that T23 is turned on, the potential of N5 is low voltage, T13 is turned on, GCK provides a low voltage signal, T12 is turned on, T14 is turned on, the potential of N7 and the potential of N8 are low voltage, T15 is turned on to control the potential of N3 to be high voltage, the potential of N5 is low voltage to turn on T17, and the potential of NC1 is high voltage; T10 and T11 are turned on, and the potential of NC2 and the potential of NC3 are both low voltage;

In the second phase, NS(N−1) outputs a low voltage signal, the potential of the first clock signal output by GCK jumps f-om low voltage to high voltage, GCB outputs a low voltage signal, T19 and T21 are turned off, and the potential of N5 is low voltage, T12 is turned off, the potential of N5 is maintained at a low voltage, T13 is turned on, T14 is turned on, the potentials of N7 and the potential of N8 are high voltages. T15 is turned off, the potential of N3 is maintained at the high voltage of the previous phase, and T16 is turned on to maintain the potential of NC1 at a high voltage, and T25 is turned off; at the same time, the potential of N6 is low voltage, and T23 is turned on, GCB writes a low voltage signal into N4, and the potential of N6 is pulled down to a lower voltage through C4 (5V-0V lower than the voltage value of the low-voltage signal provided by GCB), T10 and T11 are turned on, to write the low voltage signal into NC2 and N6 (the potential of NC2 is 3-8V lower than the voltage value of the low voltage signal provided by GCB), T26 is fully turned on, NS(N) to output a low voltage signal; the potential of NC3 is low voltage, T6 is turned on, and NO (N) outputs a low voltage signal; the potential of N4 is low voltage, T8 is turned on to pull down the potential of N1: T9 is turned on to control the potential of NC3 to be low voltage, T6 is turned on, and NO (N) outputs a low voltage signal; since the potential of N4 is low voltage, T8 is turned on to control the potential of N1 to be low voltage, and T3 is turned on to control to connect NC1 and N2, the potential of N2 is a high voltage, and T5 is turned off;

In the third phase, NS(N−1) outputs a high voltage signal, GCK outputs a low voltage signal, and GCB outputs a high voltage signal, T19 and T21 are turned on to pull up the potential of N5 and the potential of N9, T24 and T18 are turned on, the potential of NC2 and the potential of N6 are high voltage, T26 is turned off; the potential of N6 is high voltage, T23 is turned off, the potential of N5 is high voltage, T13 is turned off, GCK outputs a low voltage signal to turn on T12, T14 is turned on to pull down the potential of N7 and the potential of N8, T15 is turned on, GCB writes a high voltage signal into N3, T16 is turned off, the potential of N5 is high voltage, T17 is turned off, and the potential of NC1 is high voltage; T25 is turned off; T22 is turned on, the potential of N4 is high voltage. T8 is turned off; the potential of NC1 and the potential of NC2 are both high voltage, NS(N) continues to output a low voltage signal; T10 and T11 are tuned off, In the third phase, N3(N−1) and NS(N) output a low voltage signal, T1 and T2 are turned on, and VCT is connected to N1;

In the third phase, when VCT provides a high voltage signal, the potential of N1 is a high voltage, T9 is turned off, T3 is turned off, and the potential of N2 is maintained at a high voltage; T9 is turned off, NC3 and N5 are disconnected, and the potential of N6 is high voltage. T10 and T11 are turned off the potential of NC3 is maintained at a low voltage, T6 is turned on, and NO (N) outputs a low voltage signal;

In the third phase, when VCT provides a low voltage signal, the potential of N1 is low voltage, T9 is turned on. T3 is turned on, NC1 and N2 are connected, the potential of N2 is high voltage, T5 is turned off, and T9 is turned on to control to connect NC3 and N5, the potential of NC3 is a high voltage, and NO (N) continuously outputs a low voltage signal:

In the fourth phase. NS(N−1) outputs a high voltage signal, the potential of the first clock signal output by GCK jumps from low voltage to high voltage, GCB outputs a low voltage signal, T19 and T21 are turned off, and the potential of N7 is maintained at low voltage, T14 is turned on, the potential of N8 is a low voltage, T15 is turned on, T16 is turned on to write a low voltage signal into N3 and NC1, T25 is turned on, NS(N) outputs a high voltage signal: at the same time, the potential of N6 is a high voltage, T23 is turned off, the potential of N4 is maintained at a high voltage, and the potential of N6 is maintained at a high voltage; T10 and T11 are turned off;

In the fourth phase, N3(N−1) outputs a high voltage signal, T2 is turned off, and T7 and T8 are turned off;

When the potential of N1 is low voltage, T9 is turned on to control to connect N5 and NC3, the potential of N5 is high voltage, the potential of NC3 is high voltage, T6 is turned off; T3 is turned on to control to connect NC1 and N2, the potential of N2 is a low voltage, T5 is turned on, T6 is turned off, and NO (N) outputs a high voltage signal;

When the potential of N1 is a high voltage, T9 is turned off to control N5 to disconnect from NC3, the potential of NC3 is maintained at a high voltage, the potential of NC3 is maintained at a low voltage in the third phase, and T6 is kept on; T3 is turned off to control NC1 to disconnect from N2, the potential of N2 is maintained at a high voltage, T5 is turned off, and NO(N) continues to output a low voltage signal;

In the fifth phase, the potential of the (N−1)th stage of driving signal output by NS(N−1) jumps from high voltage to low voltage, GCK outputs a high voltage signal, GCB outputs a low voltage signal, T19 and T21 are turned off, the potential of N5 and the potential of N9 are maintained at high voltage, and the potential of other nodes remains unchanged to ensure that NS(N) outputs a high voltage signal;

In the sixth phase, NS(N−1)outputs a low voltage signal, the potential of the first clock signal output by GCK jumps from high voltage to low voltage, GCB outputs a high voltage signal, T19 and T21 are turned on, to control the potential of N5 and the potential of N9 to be low voltage, T24 and T18 are turned on, the potential of NC2 and the potential of N6 is low voltage, T26 is turned on, the potential of N6 is low voltage, to ensure that T23 is open, and the potential of N5 is low voltage to turn on T13, T12 is turned on to pull down the potential of N7 and the potential of N8, T15 is turned on, GCB writes a high voltage signal into N3, and the potential of N5 is low voltage to turn on T17, and the potential of NC1 is pulled up to high voltage to ensure that T25 is turned off.

Optionally, when the display starts (that is, when the display device is powered on), in the reset phase before the first phase, NCX outputs a low voltage signal, T7 is turned on to control the potential of N1 to be a low voltage, and T3 is turned on to control to connect NC1 and N2; T9 is turned on to control to connect NC3 and N5; T20 is turned on to control the potential of N5 and the potential of NC3 to be a high voltage; at this time, NC1 and N2 are at low potential, T25 is turned on, T5 is turned on, NS(N) and NO (N) output a high voltage signal, which can turn on the second display control transistor M2 included in all pixel circuits in the valid display area, clear the residual charge in the storage capacitor Cst, and improve the poor startup screen flicker;

After that, when both NS(N) and N3(N−1) output low voltage signals, T1 and T2 are turned on to control to connect VCT and N1;

When VCT provides a low voltage signal, the potential of N1 is low voltage, and C1 maintains the potential of N1; T3 is turned on to control to connect NC1 and N2. At this time, the potential of NC1 is high voltage, and the potential of N2 is high voltage. T5 is turned off, T9 is turned on to control to connect NC3 and N5, the potential of NC3 is high voltage, and NO (N) continues to output a low voltage signal;

When VCT provides a high voltage signal, the potential of N1 is high voltage, T3 is turned off, NC1 and N2 are disconnected, C1 controls the potential of N2 to be high voltage, T9 is turned off, NC3 and N5 are disconnected, and the potential of N6 is high voltage, T10 and T11 are turned off, the potential of NC3 is maintained at low voltage, T6 is turned on, and NO (N) outputs a low voltage signal;

Afterwards, in the supply phase of the Nth stage of driving signal, NS(N) outputs a high voltage signal. At this time, the potential of NC1 is low voltage, and the potential of NC2 is high voltage: when the potential of N1 is low voltage, T3 is turned on, and NC1 is connected to N2, the potential of N2 is low voltage, T9 is turned on to control to connect N5 and NC3, the potential of N5 is high voltage, the potential of NC3 is high voltage, T6 is turned off; T5 is turned on, T6 is turned off, NO (N) output high voltage signal;

When the potential of N1 is a high voltage, T3 is turned off, NC1 and N2 are disconnected, the potential of N2 is maintained at a high voltage, T9 is turned off to control N5 to disconnect from NC3, and the potential of NC3 is maintained at a low voltage, T6 is turned on; T5 is turned off, NO (N) continually outputs a low voltage signal;

After the supply phase of the Nth stage of driving signal, when the potential of N4 is low voltage. T8 is turned on to control to connect N1 and VGL, and the potential of N1 is low voltage, T3 is turned on to control to connect NC1 and N2. At this time, the potential of NC1 is high voltage, the potential of NC2 is low voltage, the potential of N2 is high voltage, T9 is turned on to control to connect NC3 and N5, when the potential of N5 and the potential of N6 are both a low voltage. T10 and T11 are turned on, the potential of NC3 is a low voltage, and NO (N) outputs a low voltage signal.

When at least one embodiment of the driving circuit shown in FIG. 22 of the present disclosure is working, when N3(N−1) outputs a low voltage signal and NS (N) outputs a low voltage signal, T1 and T2 are turned on, and the above two signals are simultaneously connected, the state of the gating input signal within a high and low frequency switching period can be obtained.

Figure 23:
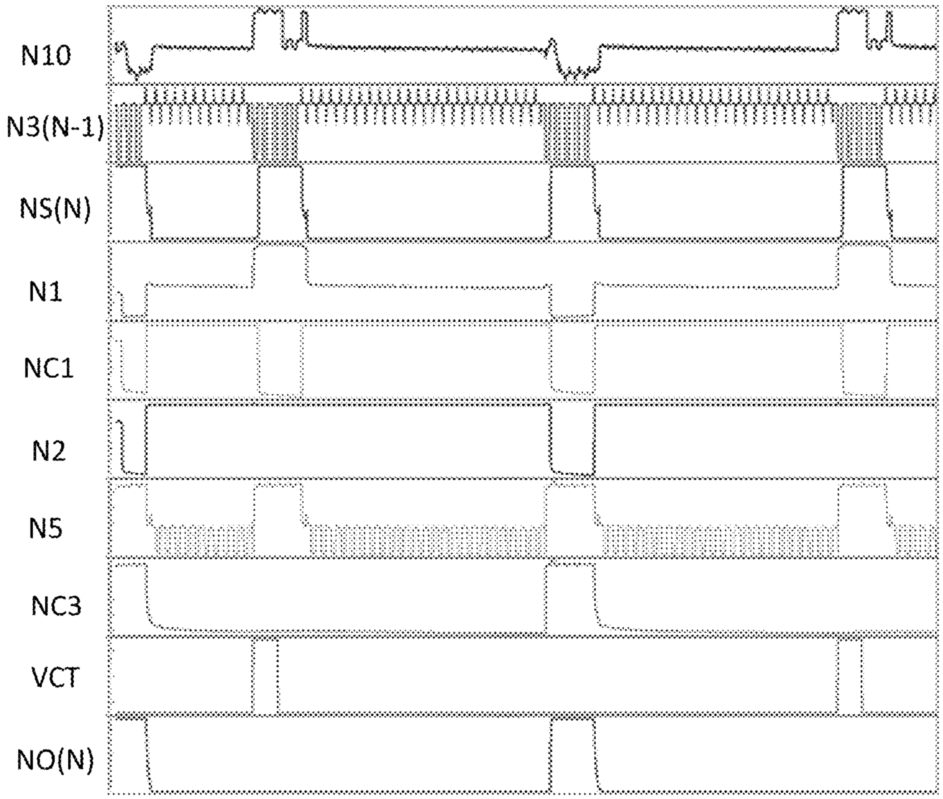
FIG. 23 is a simulation timing diagram of the driving circuit shown in FIG. 22.
Figure 24:
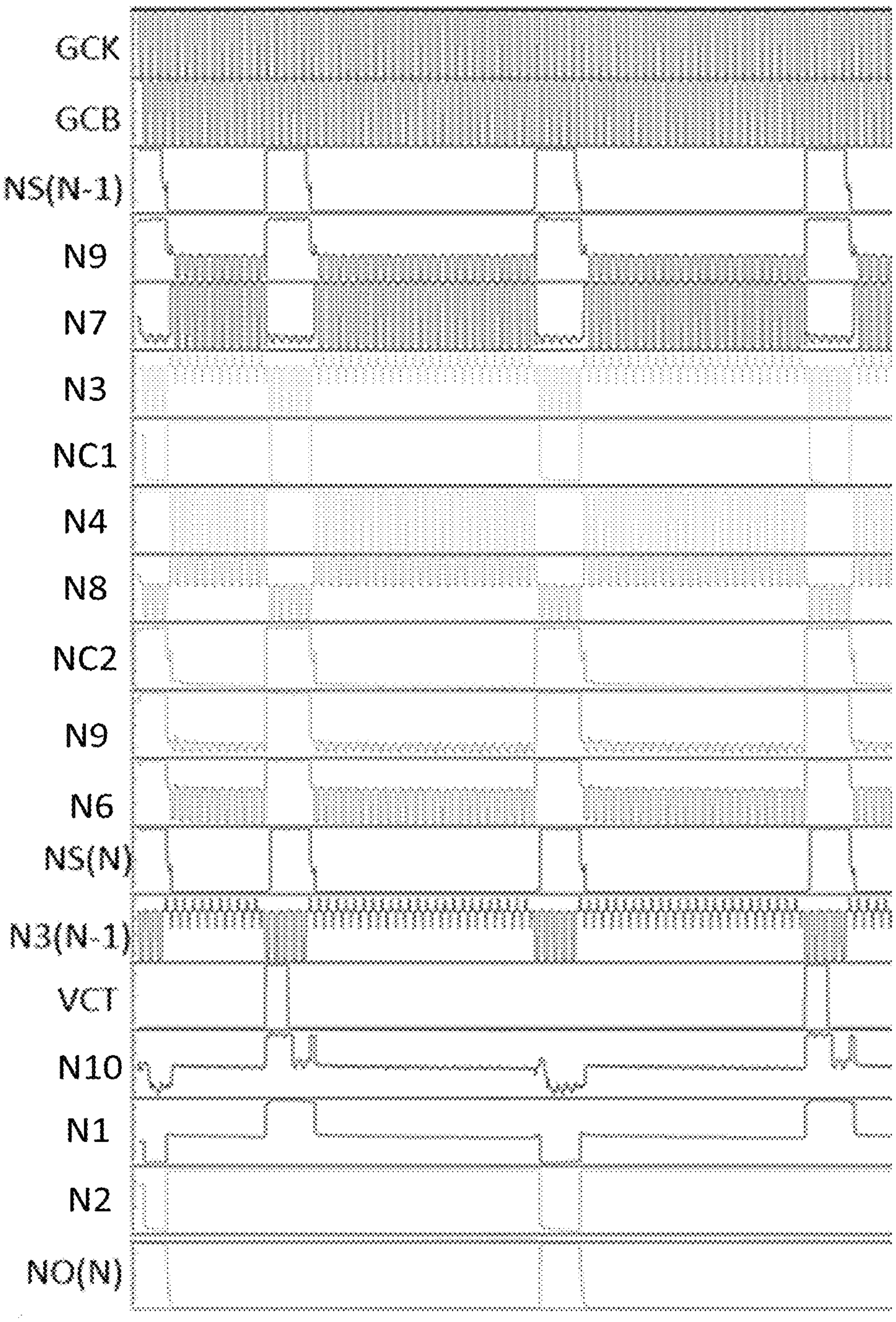
FIG. 24 is a simulation timing diagram of the driving circuit shown in FIG. 22.

FIG. 23 is a simulation timing diagram of the driving circuit shown in FIG. 22 of at least one embodiment of the present disclosure;

FIG. 24 is a simulation timing diagram of the driving circuit shown in FIG. 22 of at least one embodiment of the present disclosure.

Figure 25:
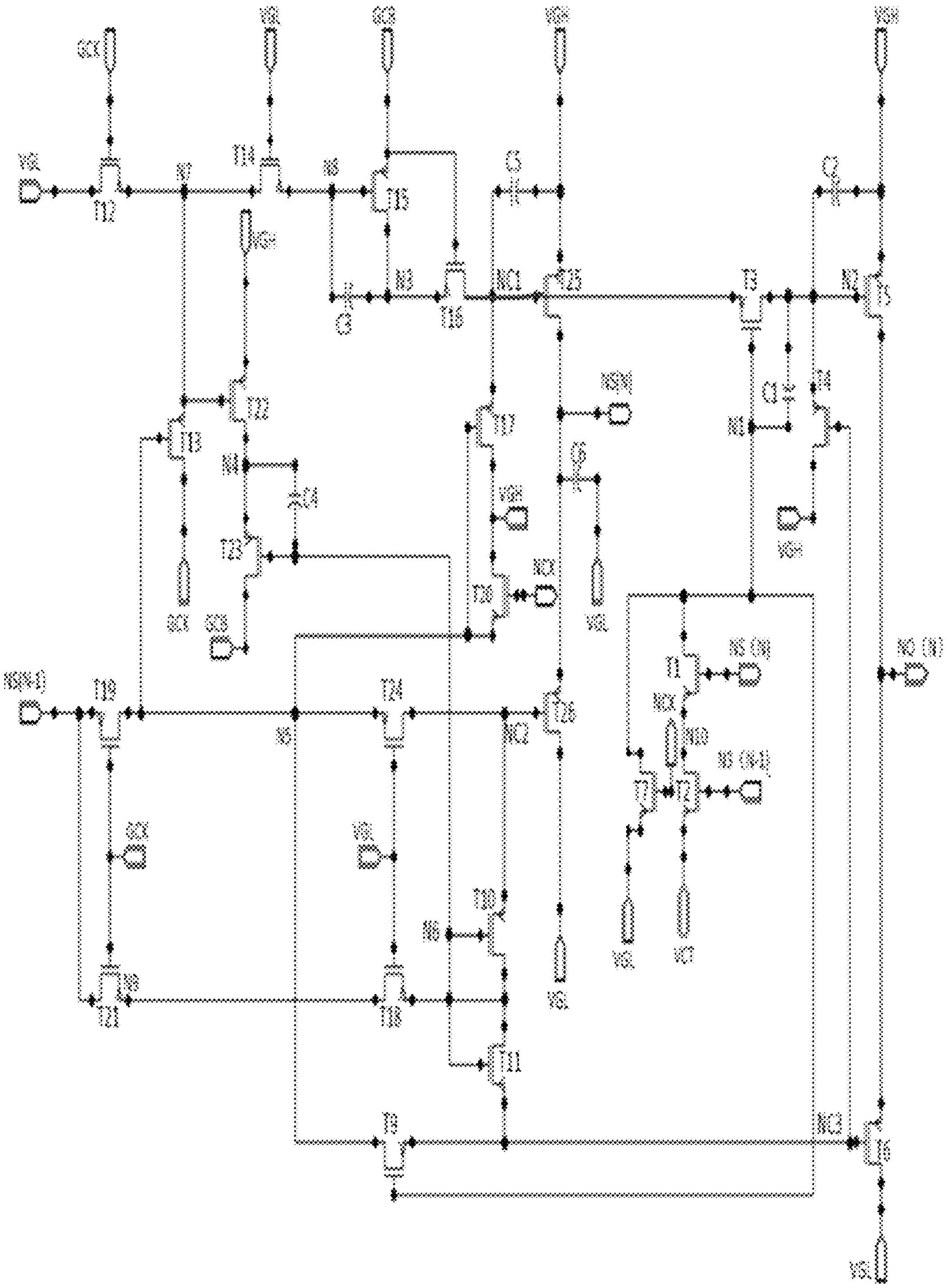
FIG. 25 is a circuit diagram of a driving circuit according to at least one embodiment of the present disclosure.

The difference between the driving circuit shown in FIG. 25 of at least one embodiment of the present disclosure and the driving circuit shown in FIG. 22 of at least one embodiment of the present disclosure is that: T8 is not provided.

Figure 26:
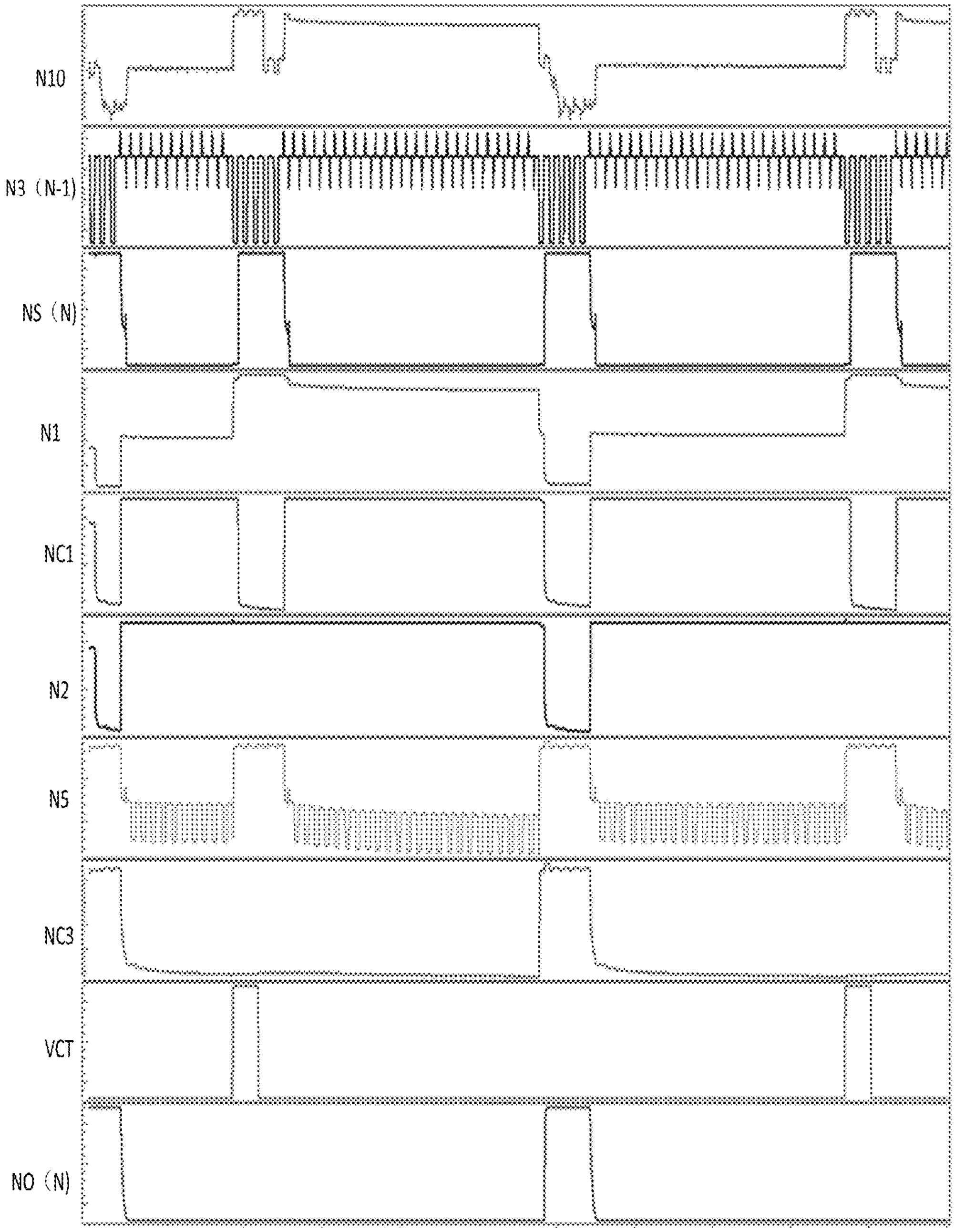
FIG. 26 is a simulation timing diagram of the driving circuit shown in FIG. 25.

FIG. 26 is a simulation timing diagram of the driving circuit shown in FIG. 25 of at least one embodiment of the present disclosure.

The driving method described in the embodiment of the present disclosure is applied to the above-mentioned driving circuit, and the driving method includes:

generating and outputting, by the driving signal generation circuit, the Nth stage of driving signal through the Nth stage of driving signal output terminal under the control of the potential of the first control node and the potential of the second control node;

controlling, by the output control circuit, to connect the first control node and the second node under the control of the potential of the first node;

controlling, by the gate circuit, to write the gating input signal provided by the gating input terminal into the first node under the control of the gating control signal;

controlling, by the voltage control circuit, the potential of the second node according to the potential of the first node;

controlling, by the output circuit, to connect the output driving terminal and the first voltage terminal under the control of the potential of the second node, and controlling, by the output circuit, to connect the output driving terminal and the second voltage terminal under the control of the potential of the third control node;

wherein the third control node and the second control node are different nodes; N is a positive integer.

The driving module described in the embodiment of the present disclosure includes a plurality of stages of the above-mentioned driving circuits;

an Nth stage of driving circuit is electrically connected to a driving signal output terminal of an (N−1)th stage of driving circuit; N is a positive integer.

Figure 27:
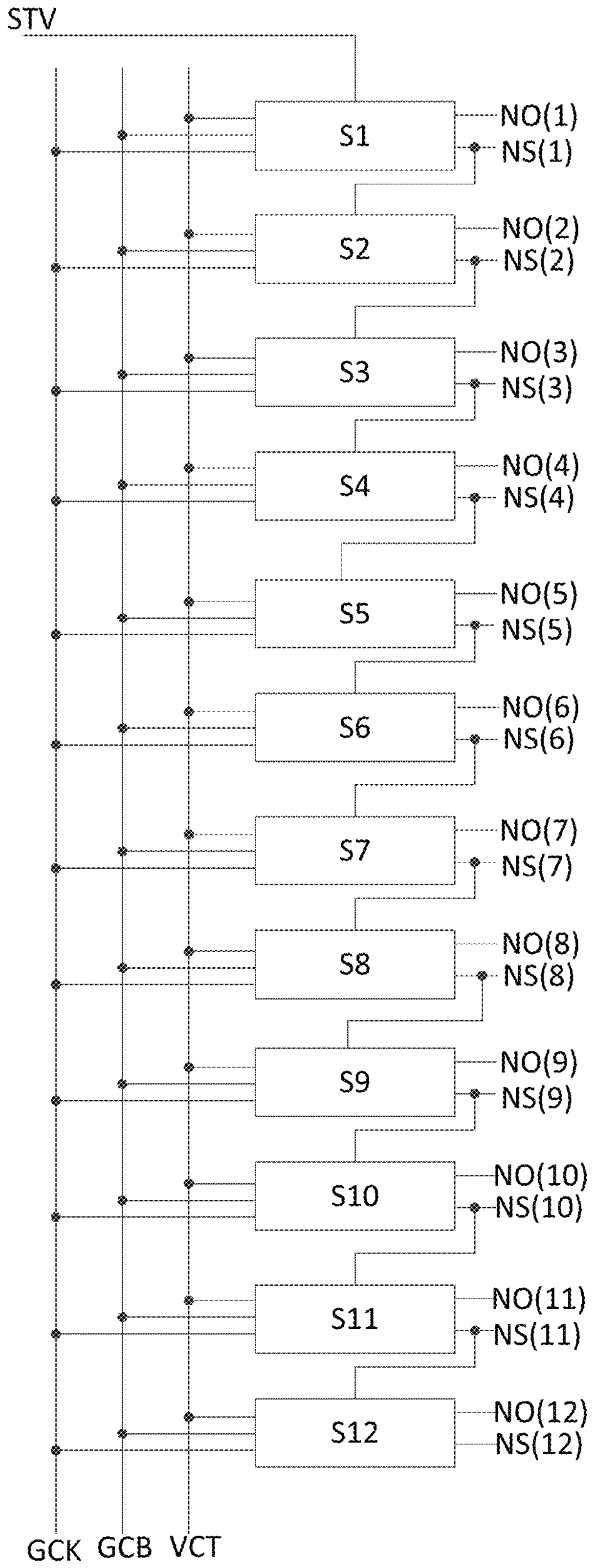
FIG. 27 is a structural diagram of a driving module according to at least one embodiment of the present disclosure.

As shown in FIG. 27, the one labeled S1 is the first stage of driving circuit, the one labeled S2 is the second stage of driving circuit, the one labeled S3 is the third stage of driving circuit, and the one labeled S4 is the fourth stage of driving circuit, the one labeled S5 is the fifth stage of driving circuit, the one labeled S6 is the sixth stage of driving circuit, the one labeled S7 is the seventh stage of driving circuit, the one labeled S8 is the eighth stage of driving circuit, and the one labeled S9 is the ninth stage of driving circuit, the one labeled S10 is the tenth stage of driving circuit, the one labeled S11 is the eleventh stage of driving circuit, and the one labeled S12 is the twelfth-stage of driving circuit;

The one labeled NS (1) is the driving signal output terminal of S1, and the one labeled NO (1) is the output driving terminal of S1;

The one labeled NS (2) is the driving signal output terminal of S2, and the one labeled NO(2) is the output driving terminal of S2; S2 is electrically connected to NS (1);

The one labeled NS (3) is the driving signal output terminal of S3, and the one labeled NO (3) is the output driving terminal of S3; S3 is electrically connected to NS (2);

The one labeled NS (4) is the driving signal output terminal of S4, and the one labeled NO(4) is the output driving terminal of S4; S4 is electrically connected to NS (3);

The one labeled NS (5) is the driving signal output terminal of S5, and the one labeled NO(5) is the output driving terminal of S5; S5 is electrically connected to NS (4);

The one labeled NS (6) is the driving signal output terminal of S6, and the one labeled NO(6) is the output driving terminal of S6; S6 is electrically connected to NS(5);

The one labeled NS (7) is the driving signal output terminal of S7, and the one labeled NO (7) is the output driving terminal of S7; S7 is electrically connected to NS (6);

The one labeled NS (8) is the driving signal output terminal of S8, and the one labeled NO(8) is the output driving terminal of S8; S8 is electrically connected to NS (7);

The one labeled NS (9) is the driving signal output terminal of S9, and the one labeled NO(9) is the output driving terminal of S9; S9 is electrically connected to NS (8);

The one labeled NS (10) is the driving signal output terminal of S10, and the one labeled NO (10) is the output driving terminal of S10; S10 is electrically connected to NS (9);

The one labeled NS (11) is the driving signal output terminal of S11, and the one labeled NO (11) is the output driving terminal of S11; S11 is electrically connected to NS (10);

The one labeled NS (12) is the driving signal output terminal of S12, and the one labeled NO (12) is the output driving terminal of S12; S12 is electrically connected to NS (11);

S1, S2, S3, S4, S5, S6, S7, S8, S9, S10, S11 and S12 are all electrically connected to the gating input terminal VCT;

S1, S2, S3, S4, S5, S6, S7, S8, S9, S10, S11 and S12 are all electrically connected to the first clock signal terminal GCK;

S1, S2, S3, S4, S5, S6, S7, S8, S9, S10, S11 and S12 are all electrically connected to the second clock signal terminal GCB.

In FIG. 27, the one labeled STV is the initial voltage terminal, and S1 is electrically connected to STV.

Figure 28:
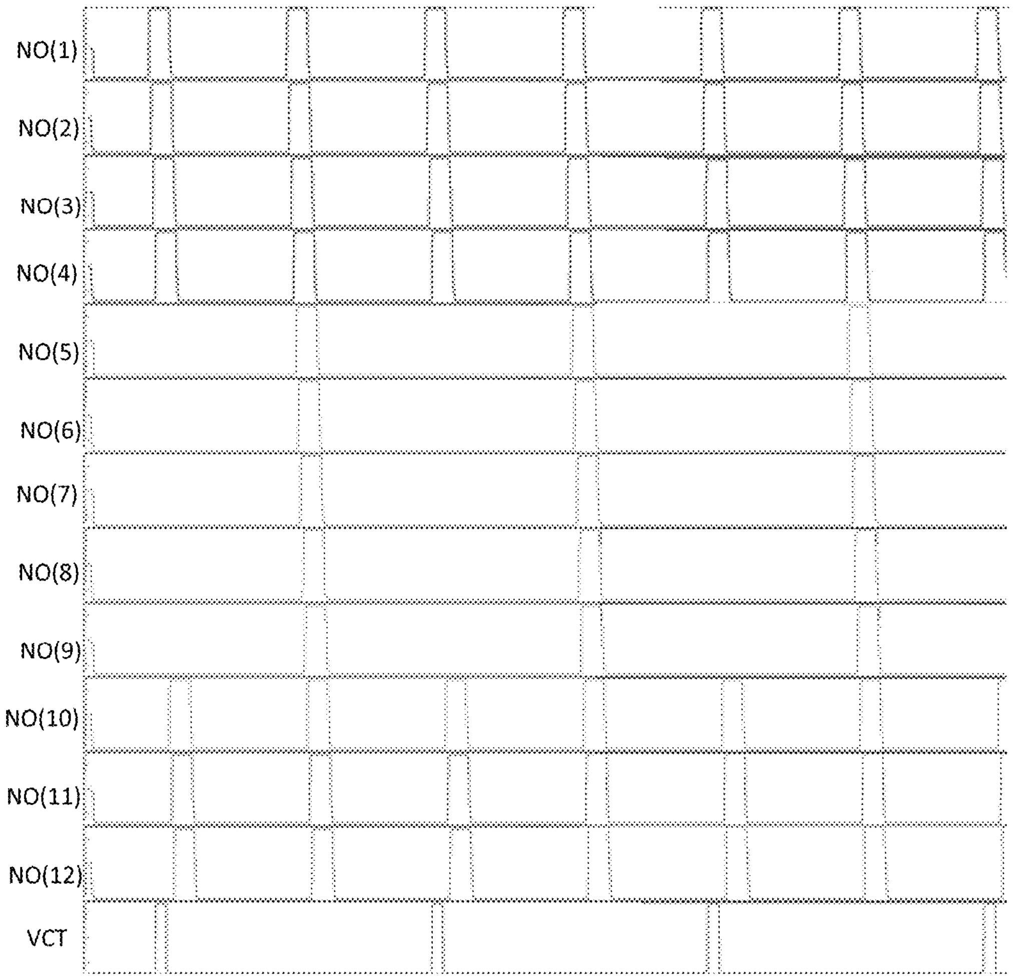
FIG. 28 is a working timing diagram of the driving module shown in FIG. 27.

FIG. 28 is a working timing diagram of the driving module shown in FIG. 27.

When the driving module shown in FIG. 27 of the present disclosure is working, and NS(N−1) outputs a high voltage signal and NS(N) outputs a low voltage signal, if VCT outputs a low voltage signal, then when NS(N) outputs a high voltage signal, NO (N) outputs a high voltage signal;

When NS(N−1) outputs a high voltage signal and NS(N) outputs a low voltage signal, if VCT outputs a high voltage signal, then when NS(N) outputs a high voltage signal, NO(N) outputs a low voltage signal.

Figure 29:
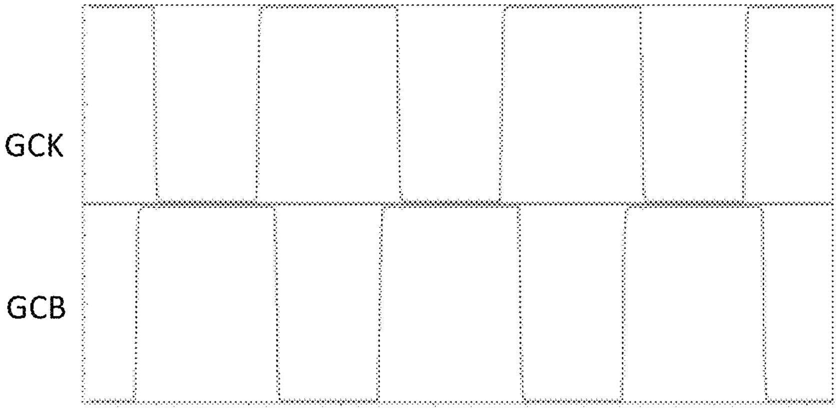
FIG. 29 is a waveform diagram of the first clock signal provided by GCK and the second clock signal provided by GCB.

FIG. 29 is a waveform diagram of the first clock signal provided by GCK and the second clock signal provided by GCB.

The display device described in the embodiment of the present disclosure includes the above-mentioned driving module.

The display device provided by the embodiments of the present disclosure may be any product or component with a display function, such as a mobile phone, a tablet computer, a television, a monitor, a notebook computer, a digital photo frame, a navigator, and the like.

The above descriptions are implementations of the present disclosure. It should be pointed out that those skilled in the art can make some improvements and modifications without departing from the principle of the present disclosure. These improvements and modifications shall also fall within the scope of the present disclosure.

What is claimed is:

1. A driving circuit, comprising a driving signal generation circuit, an output control circuit, a gating circuit, a voltage control circuit and an output circuit; wherein the driving signal generation circuit is electrically connected to a first control node, a second control node and an Nth stage of driving signal output terminal, is configured to generate and output an Nth stage of driving signal through the Nth stage of driving signal output terminal under the control of a potential of the first control node and a potential of the second control node;

the output control circuit is electrically connected to a first node, the first control node and a second node respectively, and is configured to control to connect the first control node and the second node under the control of a potential of the first node;

the gating circuit is electrically connected to the first node, a gating input terminal and a gating control terminal, and is configured to control to write a gating input signal provided by the gating input terminal into the first node under the control of a gating control signal provided by the gating control terminal;

the voltage control circuit is electrically connected to the first node and the second node respectively, and is configured to control a potential of the second node according to the potential of the first node;

the output circuit is electrically connected to the second node, a third control node, a first voltage terminal, a second voltage terminal and an output driving terminal respectively, is configured to control to connect the output driving terminal and the first voltage terminal under the control of the potential of the second node, and control to connect the output driving terminal and the second voltage terminal under the control of a potential of the third control node;

the third control node and the second control node are different nodes, N is a positive integer.

2. The driving circuit according to claim 1, wherein the gating circuit is configured to control to write the gating input signal provided by the gating input terminal into the first node when a potential of the (N-1)th stage of third node is a second voltage and a potential of the Nth stage of driving signal is the second voltage.

3. The driving circuit according to claim 1, wherein the gating circuit includes a first transistor; a gate electrode of the first transistor is electrically connected to the gating control terminal, and a first electrode of the first transistor is electrically connected to the first node, a second electrode of the first transistor is electrically connected to the gating input terminal.

4. The driving circuit according to claim 1, wherein the gating control terminal includes a first gating control terminal and a second gating control terminal; the gating circuit includes a first transistor and a second transistor;

a gate electrode of the first transistor is electrically connected to the first gating control terminal, a first electrode of the first transistor is electrically connected to the first node, and a second electrode of the first transistor is electrically connected to a first electrode of the second transistor;

a gate electrode of the second transistor is electrically connected to the second gating control terminal, and a second electrode of the second transistor is electrically connected to the gating input terminal;

the first gating control terminal is the Nth stage of driving signal output terminal, the second gating control terminal is an (N-1)th stage of third node, and both the first transistor and the second transistor are p-type transistors; or, the first gating control terminal is the (N-1)th stage of third node, the second gating control terminal is the Nth stage of driving signal output terminal, and the first transistor and the second transistor are p-type transistors; or, the first gating control terminal is the (N-1) th stage of driving signal output terminal, the second gating control terminal is the Nth stage of driving signal output terminal, the first transistor is an n-type transistor, and the second transistor is a p-type transistor; or, the first gating control terminal is the Nth stage of driving signal output terminal, the second gating control terminal is the (N-1)th stage of driving signal output terminal, the first transistor is a p-type transistor, and the second transistor is an n-type transistor; or, the first gating control terminal is connected to an inversion signal of the (N-1)th stage of driving signal, the second gating control terminal is the Nth stage of driving signal output terminal, the first transistor and the second transistor are both p-type transistors; or, the first gating control terminal is the Nth stage of driving signal output terminal, and the second gating control terminal is connected to the inversion signal of the (N-1)th stage of driving signal; the first transistor and the second transistor are both p-type transistors; or, the first gating control terminal is the (N-1) th stage of driving signal terminal, the second gating control terminal is connected to an inversion signal of the Nth stage of driving signal, and the first transistor and the second transistor are both n-type transistors; or, the first gating control terminal is connected to the inversion signal of the Nth stage of driving signal, the second gating control terminal is the (N-1) th stage of driving signal terminal, and the first transistor and the second transistor are both n-type transistors.

5. The driving circuit according to claim 1, wherein the output control circuit includes a third transistor;

a gate electrode of the third transistor is electrically connected to the first node, a first electrode of the third transistor is electrically connected to the first control node, and a second electrode of the third transistor is electrically connected to the second node;

or wherein the voltage control circuit includes a first capacitor;

a first terminal of the first capacitor is electrically connected to the first node, and a second terminal of the first capacitor is electrically connected to the second node:

or the driving circuit further includes a second node control circuit; wherein the second node control circuit is electrically connected to a third control node, a second node and a first voltage terminal, and is configured to control to connect the second node and the first voltage terminal under the control of a potential of the third control node, wherein the second node control circuit comprises a fourth transistor;

a gate electrode of the fourth transistor is electrically connected to the third control node, a first electrode of the fourth transistor is electrically connected to the second node, and a second electrode of the fourth transistor is connected to the first voltage terminal;

or wherein the output circuit includes a fifth transistor, a sixth transistor and a second capacitor;

a gate electrode of the fifth transistor is electrically connected to the second node, a first electrode of the fifth transistor is electrically connected to the first voltage terminal, and a second electrode of the fifth transistor is electrically connected to the output driving terminal:

a gate electrode of the sixth transistor is electrically connected to the third control node. a first electrode of the sixth transistor is electrically connected to the output driving terminal, and a second electrode of the sixth transistor is connected to the second voltage terminal;

a first terminal of the second capacitor is electrically connected to the second node, and a second terminal of the second capacitor is electrically connected to the first voltage terminal.

6. The driving circuit according to claim 1, further comprising an initialization circuit; wherein the initialization circuit is electrically connected to an initial control terminal, a second voltage terminal and the first node, and is configured to control to connect the first node and the second voltage terminal under the control of an initial control signal provided by the initial control terminal.

7. The driving circuit according to claim 6, wherein the initialization circuit comprises a seventh transistor;

a gate electrode of the seventh transistor is electrically connected to the initial control terminal, a first electrode of the seventh transistor is electrically connected to the first node, and a second electrode of the seventh transistor is electrically connected to the second voltage terminal.

8. The driving circuit according to claim 1, further comprising a first node control circuit; wherein the first node control circuit is electrically connected to a fourth node, a second voltage terminal and the first node, and is configured to control to connect the first node and the second voltage terminal under the control of a potential of the fourth node.

9. The driving circuit according to claim 8, wherein the first node control circuit comprises an eighth transistor;

a gate electrode of the eighth transistor is electrically connected to a fourth node, a first electrode of the eighth transistor is electrically connected to the first node, and a second electrode of the eighth transistor is electrically connected to the second voltage terminal.

10. The driving circuit according to claim 1, further comprising a third control node control circuit; wherein the third control node control circuit is respectively electrically connected to the first node, a fifth node, the second control node, a third control node and a sixth node, and is configured to control to connect the fifth node and the third control node under the control of the potential of the first node, and control to connect the second control node and the sixth node and control to connect the sixth node and the third control node under the control of a potential of the sixth node.

11. The driving circuit according to claim 10, wherein the third control node control circuit comprises a ninth transistor, a tenth transistor and an eleventh transistor;

a gate electrode of the ninth transistor is electrically connected to the first node, a first electrode of the ninth transistor is electrically connected to the fifth node, and a second electrode of the ninth transistor is electrically connected to the third control node;

a gate electrode of the tenth transistor and a second electrode of the tenth transistor are both electrically connected to the sixth node, and a first electrode of the tenth transistor is electrically connected to the second control node;

both a gate electrode of the eleventh transistor and a first electrode of the eleventh transistor are electrically connected to the sixth node, and a second electrode of the eleventh transistor is electrically connected to the third control node.

12. The driving circuit according to claim 1, wherein the driving sigual generation circuit includes a first driving output circuit, a second driving output circuit, a first control node control circuit, and a second control node control circuit;

the first control node control circuit is configured to control the potential of the first control node;

the second control node control circuit is configured to control the potential of the second control node;

the first driving output circuit is electrically connected to the first control node, the first voltage terminal and the Nth stage of driving signal output terminal, and is configured to control to connect the Nth stage of driving signal output terminal and the first voltage terminal under the control of the potential of the first control node;

the second driving output circuit is electrically connected to the second control node, the second voltage terminal and the Nth stage of driving signal output terminal, and is configured to control to connect the Nth stage of driving signal output terminal and the second voltage terminal under the control of the potential of the second control node.

13. The driving circuit according to claim 12, wherein the first control node control circuit includes a seventh node control circuit, an eighth node control circuit, a third node control circuit, and a first control circuit;

the seventh node control circuit is electrically connected to a seventh node, the second voltage terminal, a first clock signal terminal and a fifth node, and is configured to control to connect the seventh node and the second voltage terminal under the control of a first clock signal provided by the first clock signal terminal, and control to connect the seventh node and the first clock signal terminal under the control of a potential of the fifth node;

the eighth node control circuit is electrically connected to the second voltage terminal, the seventh node, and an eighth node, and is configured to control to connect the seventh node and the eighth node under the control of a second voltage signal provided by the second voltage terminal;

the third node control circuit is electrically connected to the eighth node, the second clock signal terminal and the third node, and is configured to control to connect the third node and the second clock signal terminal under the control of a potential of the eighth node, and control the potential of the third node according to the potential of the eighth node;

the first control circuit is electrically connected to a second clock signal terminal, the third node, the first control node, the fifth node and the first voltage terminal, and is configured to control to connect the third node and the first control node under the control of a second clock signal provided by the second clock signal terminal, and control to connect the first control node and the first voltage terminal under the control of a potential of the fifth node.

14. The driving circuit according to claim 13, wherein the seventh node control circuit includes a twelfth transistor and a thirteenth transistor, the eighth node control circuit includes a fourteenth transistor, and the third node control circuit includes a fifteenth transistor and a third transistor, the first control circuit includes a sixteenth transistor and a seventeenth transistor;

a gate electrode of the twelfth transistor is electrically connected to the first clock signal terminal, a first electrode of the twelfth transistor is electrically connected to the second voltage terminal, and a second electrode of the twelfth transistor is electrically connected to the seventh node;

a gate electrode of the thirteenth transistor is electrically connected to the fifth node, a first electrode of the thirteenth transistor is electrically connected to the seventh node, and a second electrode of the thirteenth transistor is electrically connected to the first clock signal terminal;

a gate electrode of the fourteenth transistor is electrically connected to the second voltage terminal, a first electrode of the fourteenth transistor is electrically connected to the seventh node, and a second electrode of the fourteenth transistor is electrically connected to the eighth node;

a gate electrode of the fifteenth transistor is electrically connected to the eighth node, a first electrode of the fifteenth transistor is electrically connected to the second clock signal terminal, and a second electrode of the fifteenth transistor is electrically connected to the third node;

a gate electrode of the sixteenth transistor is electrically connected to the second clock signal terminal, a first electrode of the sixteenth transistor is electrically connected to the third node, and a second electrode of the sixteenth transistor is electrically connected to the first control node;

a gate electrode of the seventeenth transistor is electrically connected to the fifth node, a first electrode of the seventeenth transistor is electrically connected to the first control node, and a second electrode of the seventeenth transistor is electrically connected to the first voltage terminal.

15. The driving circuit according to claim 12, wherein the second control node control circuit includes a sixth node control circuit, a fifth node control circuit, a ninth node control circuit, a fourth node control circuit, and a second control circuit;

the sixth node control circuit is electrically connected to the second voltage terminal, a ninth node, a sixth node, and a fourth node, and is configured to control to connect the ninth node and the sixth node under the control of the second voltage signal provided by the second voltage terminal, and control a potential of the sixth node according to a potential of the fourth node;

the fifth node control circuit is respectively electrically connected to the (N-1)th stage of driving signal output terminal, the first clock signal terminal, a fifth node, the initial control terminal and the first voltage terminal, is configured to control to connect the fifth node and the (N-1) th stage of driving signal output terminal under the control of the first clock signal provided by the first clock signal terminal, and control to connect the fifth node and the first voltage terminal under the control of the initial control signal provided by the initial control terminal;

the ninth node control circuit is electrically connected to the first clock signal terminal, the (N-1) th stage of driving signal output terminal and a ninth node respectively, and is configured to control to connect the ninth node and the (N-1) th stage of driving signal output terminal under the control of the first clock signal provided by the first clock signal terminal;

the fourth node control circuit is electrically connected to the seventh node, the first voltage terminal, the fourth node, the second clock signal terminal and the sixth node, and is configured to control to connect the fourth node and the first voltage terminal under the control of a potential of the seventh node, and control to connect the fourth node and the second clock signal terminal under the control of a potential of the sixth node;

the second control circuit is electrically connected to the second voltage terminal, the fifth node and the second control node, and is configured to control to connect the fifth node and the second control node under the control of the second voltage signal provided by the second voltage terminal.

16. The driving circuit according to claim 15, wherein the sixth node control circuit includes an eighteenth transistor and a fourth capacitor, the fifth node control circuit includes a nineteenth transistor and a twentieth transistor, and the ninth node control circuit includes a twenty-first transistor, the fourth node control circuit includes a twenty-second transistor and a twenty-third transistor, and the second control circuit includes a twenty-fourth transistor;

a gate electrode of the eighteenth transistor is electrically connected to the second voltage terminal, a first electrode of the eighteenth transistor is electrically connected to the ninth node, and a second electrode of the eighteenth transistor is electrically connected to the sixth node;

a first terminal of the fourth capacitor is electrically connected to the fourth node, and a second terminal of the fourth capacitor is electrically connected to the sixth node;

a gate electrode of the nineteenth transistor is electrically connected to the first clock signal terminal, a first electrode of the nineteenth transistor is electrically connected to the (N-1) th stage of driving signal output terminal, and a second electrode of the nineteenth transistor is electrically connected to the fifth node;

a gate electrode of the twentieth transistor is electrically connected to the initial control terminal, a first electrode of the twentieth transistor is electrically connected to the first voltage terminal, and a second electrode of the twentieth transistor is electrically connected to the fifth node;

a gate electrode of the twenty-first transistor is electrically connected to the first clock signal terminal, a first electrode of the twenty-first transistor is electrically connected to the (N-1) th stage of driving signal output terminal, and a second electrode of the twenty-first transistor is electrically connected to the ninth node;

a gate electrode of the twenty-second transistor is electrically connected to the seventh node, a first electrode of the twenty-second transistor is electrically connected to the first voltage terminal, and a second electrode of the twenty-second transistor is electrically connected to the fourth node;

a gate electrode of the twenty-third transistor is electrically connected to the sixth node, a first electrode of the twenty-third transistor is electrically connected to the fourth node, and a second electrode of the twenty-third transistor is electrically connected to the second clock signal terminal;

a gate electrode of the twenty-fourth transistor is electrically connected to the second voltage terminal, a first electrode of the twenty-fourth transistor is electrically connected to the ninth node, a second electrode of the twenty-fourth transistor is electrically connected to the second control node.

17. The driving circuit according to claim 12, wherein the first driving output circuit includes a twenty-fifth transistor and a fifth capacitor, and the second driving output circuit includes a twenty-sixth transistor and a sixth capacitor;

a gate electrode of the twenty-fifth transistor is electrically connected to the first control node, a first electrode of the twenty-fifth transistor is electrically connected to the first voltage terminal, and a second electrode of the twenty-fifth transistor is electrically connected to the Nth stage of driving signal output terminal;

a first terminal of the fifth capacitor is electrically connected to the first control node, and a second terminal of the fifth capacitor is electrically connected to the first voltage terminal;

a gate electrode of the twenty-sixth transistor is electrically connected to the second control node, a first electrode of the twenty-sixth transistor is electrically connected to the Nth stage of driving signal output terminal, and a second electrode of the twenty-sixth transistor is electrically connected to the second voltage terminal;

a first terminal of the sixth capacitor is electrically connected to the Nth stage of driving signal output terminal, and a second terminal of the sixth capacitor is electrically connected to the second voltage terminal.

18. A driving method applied to the driving circuit according to claim 1, comprising:

generating and outputting, by the driving signal generation circuit, the Nth stage of driving signal through the Nth stage of driving signal output terminal under the control of the potential of the first control node and the potential of the second control node;

controlling, by the output control circuit, to connect the first control node and the second node under the control of the potential of the first node;

controlling, by the gating circuit, to write the gating input signal provided by the gating input terminal into the first node under the control of the gating control signal;

controlling, by the voltage control circuit, the potential of the second node according to the potential of the first node;

controlling, by the output circuit, to connect the output driving terminal and the first voltage terminal under the control of the potential of the second node, and controlling, by the output circuit, to connect the output driving terminal and the second voltage terminal under the control of the potential of the third control node;

wherein the third control node and the second control node are different nodes; N is a positive integer.

19. A driving module, comprising a plurality of stages of driving circuits according to claim 1;

an Nth stage of driving circuit is electrically connected to a driving signal output terminal included in an (N-1) th stage of driving circuit; N is a positive integer.

20. A display device comprising the driving module according to claim 19.

* * * * *